United States Patent
Ehlers

(10) Patent No.: US 7,174,153 B2
(45) Date of Patent: Feb. 6, 2007

(54) SYSTEM AND METHOD FOR PROVIDING INFORMATION TO AN OPERATOR OF AN EMERGENCY RESPONSE VEHICLE

(76) Inventor: Gregory A Ehlers, 3524 Floramar Ter., Newport Richey, FL (US) 34652

(*) Notice: Subject to any disclaimer, the term of this patent is extended or adjusted under 35 U.S.C. 154(b) by 92 days.

(21) Appl. No.: 11/013,899

(22) Filed: Dec. 16, 2004

(65) Prior Publication Data

US 2005/0164673 A1 Jul. 28, 2005

Related U.S. Application Data

(60) Provisional application No. 60/557,186, filed on Mar. 29, 2004, provisional application No. 60/531,962, filed on Dec. 23, 2003.

(51) Int. Cl.
  *H04Q 7/20* (2006.01)
(52) U.S. Cl. .............. 455/404.2; 455/456.1; 701/201; 701/210
(58) Field of Classification Search ........... 455/404.1, 455/404.2, 456.1
  See application file for complete search history.

(56) References Cited

U.S. PATENT DOCUMENTS

| | | | |
|---|---|---|---|
| 3,402,289 A | 9/1968 | Burke et al. | |
| 3,729,706 A | 4/1973 | Hein | |
| 4,167,785 A | 9/1979 | McReynolds et al. | |
| 4,228,419 A | 10/1980 | Anderson | |
| 4,573,049 A | 2/1986 | Obeck | |
| 4,576,509 A | 3/1986 | Beaty, Sr. | |
| 5,014,052 A | 5/1991 | Obeck | |
| 5,083,125 A | 1/1992 | Brown et al. | |
| 5,134,393 A | 7/1992 | Henson | |
| 5,150,116 A | 9/1992 | West | |
| 5,172,321 A | 12/1992 | Ghaem et al. | |
| 5,241,793 A | 9/1993 | Armato | |
| 5,281,901 A | 1/1994 | Yardley et al. | |
| 5,341,130 A | 8/1994 | Yardley et al. | |
| 5,345,232 A * | 9/1994 | Robertson | 340/906 |
| 5,444,442 A | 8/1995 | Sadakata et al. | |
| 5,450,329 A | 9/1995 | Tanner | |
| 5,504,482 A | 4/1996 | Schreder | |
| 5,530,441 A | 6/1996 | Takatou et al. | |
| 5,539,398 A | 7/1996 | Hall et al. | |
| 5,650,703 A | 7/1997 | Yardley et al. | |
| 5,671,563 A | 9/1997 | Marcum | |
| 5,758,313 A | 5/1998 | Shah et al. | |
| 5,875,399 A | 2/1999 | Kallin et al. | |
| 5,917,898 A | 6/1999 | Bassa et al. | |

(Continued)

*Primary Examiner*—Erika A. Gary
(74) *Attorney, Agent, or Firm*—Howard & Howard Attorneys, P.C.

(57) ABSTRACT

An information system and method provides information to an operator of an emergency response vehicle. A destination location and a current position of the motor vehicle are established. A planned route as a function of the destination location and the current position is established and communicated to at least one traffic control system, an alternate route is established as a function of a factor which may delay travel over the planned route, the destination location, and the new current position and a modified route plan is communicated to at least one traffic control system. The traffic control received positional data on the vehicle and controls the traffic control devices under its management to expedite the transit of the emergency vehicle.

32 Claims, 19 Drawing Sheets

U.S. PATENT DOCUMENTS

| | | |
|---|---|---|
| 5,926,133 A | 7/1999 | Green, Jr. |
| 5,948,040 A | 9/1999 | DeLorme et al. |
| 5,955,968 A | 9/1999 | Bentrott et al. |
| 5,973,618 A | 10/1999 | Ellis |
| 5,983,161 A | 11/1999 | Lemelson et al. |
| 5,986,575 A | 11/1999 | Jones et al. |
| 6,012,012 A | 1/2000 | Fleck et al. |
| 6,024,510 A | 2/2000 | Kamienchick |
| 6,064,319 A | 5/2000 | Matta |
| 6,084,510 A | 7/2000 | Lemelson |
| 6,104,316 A | 8/2000 | Behr et al. |
| 6,107,941 A | 8/2000 | Jones |
| 6,112,152 A | 8/2000 | Tuttle |
| 6,124,807 A | 9/2000 | Heckeroth et al. |
| 6,129,025 A | 10/2000 | Minakami et al. |
| 6,133,854 A | 10/2000 | Yee et al. |
| 6,137,531 A | 10/2000 | Kanzaki et al. |
| 6,160,493 A | 12/2000 | Smith |
| 6,161,071 A | 12/2000 | Shuman et al. |
| 6,167,333 A | 12/2000 | Genlot |
| 6,167,345 A | 12/2000 | Strandberg et al. |
| 6,173,231 B1 | 1/2001 | Chojanacki |
| 6,185,484 B1 | 2/2001 | Rhinehart |
| 6,199,045 B1 | 3/2001 | Giniger et al. |
| 6,202,023 B1 | 3/2001 | Hancock et al. |
| 6,246,932 B1 | 6/2001 | Kageyama et al. |
| 6,393,362 B1 | 5/2002 | Burns |
| 6,418,371 B1 | 7/2002 | Arnold |
| 6,466,862 B1 | 10/2002 | DeKock et al. |
| 6,470,262 B2 | 10/2002 | Kerner et al. |
| 6,480,783 B1 | 11/2002 | Myr et al. |
| 6,490,519 B1 | 12/2002 | Lapidot et al. |
| 6,522,263 B2 | 2/2003 | Jones |
| 6,609,061 B2 | 8/2003 | MacPhail et al. |
| 6,681,175 B2 | 1/2004 | MacPhail et al. |
| 2003/0141990 A1* | 7/2003 | Coon .................. 340/902 |

* cited by examiner

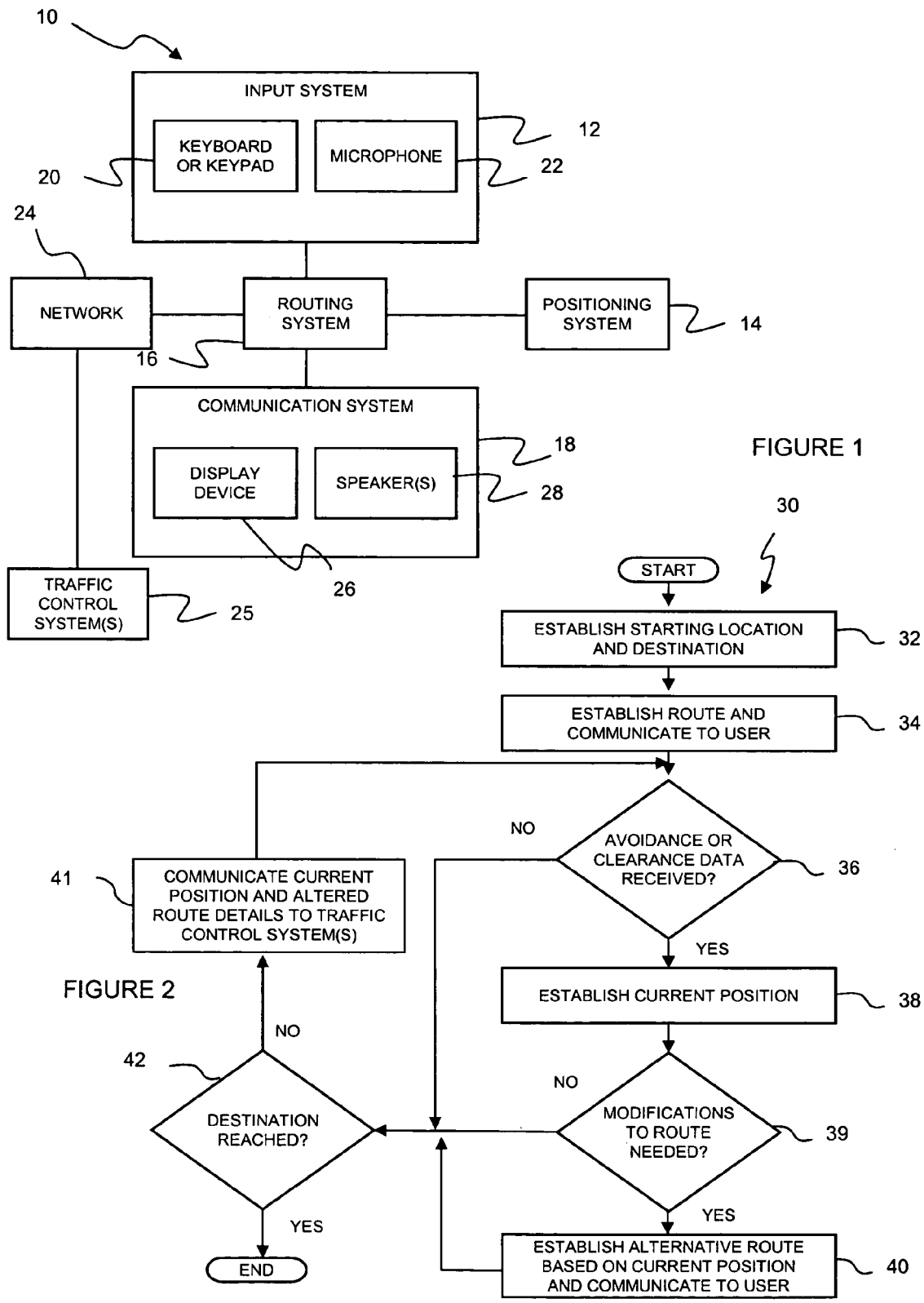

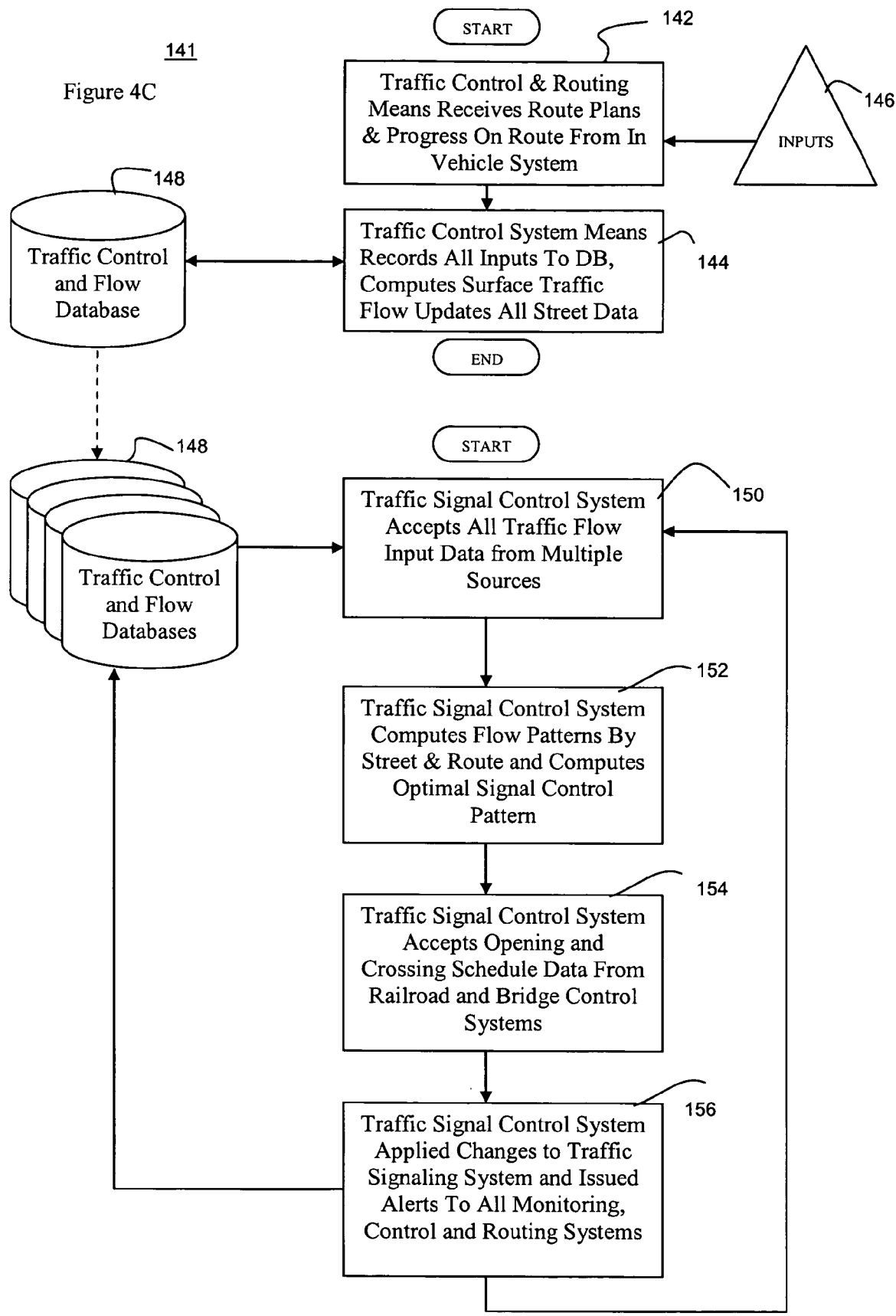

SYSTEM AND METHOD FOR PROVIDING INFORMATION TO AN OPERATOR OF AN EMERGENCY RESPONSE VEHICLE

The present application claims priority to U.S. Provisional Patent Application Ser. No. 60/531,962, filed Dec. 23, 2003, and 60/557,186, filed Mar. 29, 2004, both of which are hereby incorporated by reference.

FIELD OF THE INVENTION

The present invention relates generally to traffic routing, and more particularly, to a system and method to reduce or eliminate delays of an emergency vehicle as it travels in route from its normal post to the scene of the emergency and any other locations required to complete the emergency, rescuer or recovery process.

BACKGROUND OF THE INVENTION

Fire, ambulance, police and other emergency services in many different forms have existed in society for all recorded history. Traffic control has also existed in some form for the same period. In today's environment, as traffic levels increase, it is imperative that those responsible for providing for the safety and security services to our society have access to the best methods and systems available. Using these methods and systems, they will be able to assist emergency response personnel and vehicles in getting to the scene of an accident, fire, crime or other natural or man made incident or disaster as quickly as possible.

Over the years routing of emergency vehicles and people has taken many forms. Most of the original forms of routing were procedural in nature, specifying routes with least traffic or congestion based on historical traffic patterns based on day of week and time of day. With the advent of the 2-way radio and its use in emergency response system. Today systems like radar detection systems already possess some early warning capabilities. More advanced vehicle navigation and guidance systems will be able to alter their planned route to avoid any possible interference with the planned path of the emergency vehicle if such a feature is desired 138.

Obviously, many modifications and variations of the present invention are possible in light of the above teachings. The invention may be practiced otherwise than as specifically described within the scope of the appended claims. vehicles, more real time routing was available provided that input from traffic control points was being supplier to dispatch facilities. Over time, with the increase use of networks and devices used in traffic control, video monitors at major intersections were added to the input devices available to the dispatcher to permit direct real-time observation data as well as direct control of the traffic control signal switches at major intersection points.

Many rental cars and trucks, today are equipped with a GPS driven, computer based guidance system. These systems utilize GPS and sophisticated routing software to direct the driver, using a synthesized voice, to their destination. The system uses GPS tracking or some other suitable location monitoring and tracking system to know its current location. The driver enters an address of the desired destination and the system, using maps and sophisticated routing software, computes the fastest, shortest or most direct route based on the drivers preference. Once activated, the system will tell the driver what to do every step of the way. In addition, if the driver makes a wrong turn, the system will perform a real time re-route process and give corrective routing directions to the driver to get him back on course.

While this type of system is quite advanced and useful, it lacks the ability to get real time traffic updates from a traffic control network. Furthermore, the prior art systems are costly and in-effective.

The present invention is aimed at one or more of the problems identified above.

SUMMARY OF THE INVENTION

In one aspect of the present invention, an information system for a motor vehicle is provided. The information system includes an input system, a positioning system, and a routing system. The input system establishes a destination location of the motor vehicle. The positioning system establishes a current position of the motor vehicle. The routing system establishes a planned route as a function of the destination location and the current position, receives information relating to a factor which may delay travel over the planned route, establishes a new current position and responsively establishes an alternate route as a function of the factor, the destination location, and the new current position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a block diagram of an information system for a motor vehicle, according to an embodiment of the present invention;

FIG. 2 is a first flow diagram of a method for providing information to an operator of a motor vehicle, according to an embodiment of the present invention;

FIG. 4C is a third portion of the third flow diagram;

DETAILED DESCRIPTION OF INVENTION

Figure 3A:
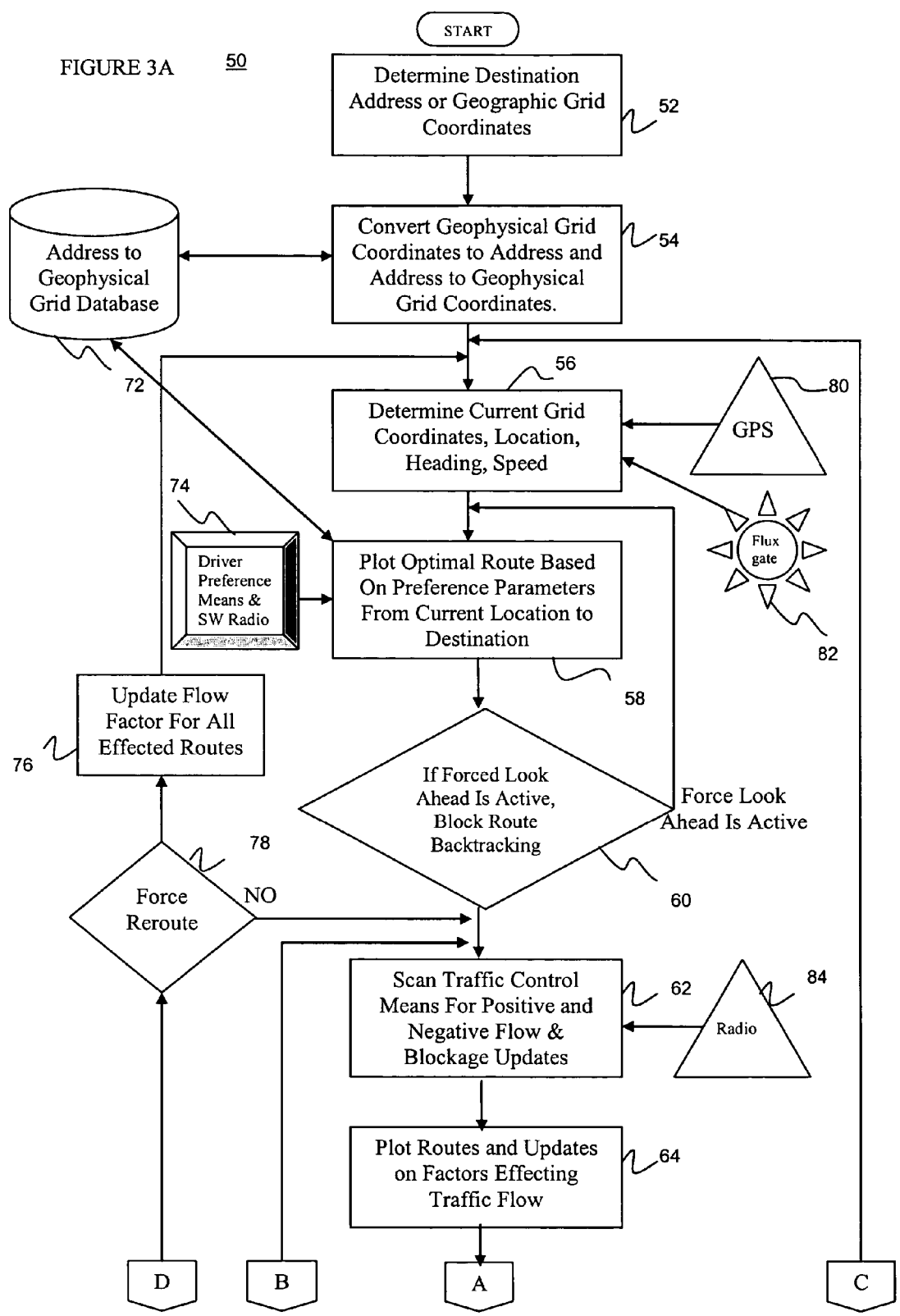
FIG. 3A is a first portion of a second flow diagram of a method for providing information to an operator of a motor vehicle, according to another embodiment of the present invention.

With reference to the drawings and in operation, the present invention related to an information or guidance system 10 for a motor vehicle (not shown). The motor vehicle may be any of type of mobile vehicle, such as an, such as an emergency vehicle or marine vessel.

Generally, the information system 10, beginning with a starting location and a destination, determines a planned route for the motor vehicle. The information system 10 may receive information, i.e., a factor, which will impact time it takes the motor vehicle to travel the planned route and responsively establishes an alternative route.

With specific reference to FIG. 1, the information system 10 includes an input system 12, a positioning system 14, a routing system 16, and a communication system 18.

The input system 10 establishes a destination location of the motor vehicle. For example, the input system 10 system may be used by an operator or driver, to establish the destination location. The input system 10 may include, e.g., a keyboard or keypad 20 and/or a microphone 22. The operator may key in a destination (or a select from a list of known or previously used destinations) on the keyboard. Alternatively, the information system may include a microphone for the operator to speak into and establish the destination through voice recognition software.

The routing system 16 is a computer based system located on onboard and incorporates software for establish a route given the destination location and a starting location. The routing system 16 establishes the planned route as a function of the destination location and a starting position, and receives information relating to a factor which may delay travel over the planned route from an external source 24. The routing system 16 may also, based, e.g., on its current position, the motor vehicle's progress along its planned route, dynamically determine if modifications to the planned route are needed, and if so, establishes an alternate route as a function of the factor, the destination location, and a current position of the motor vehicle.

The position positioning system 14, which may be a global position system, is used to establish the current position of the motor vehicle.

The communication system 18 may be used to implement to communicate information to the operator and may include a display device 26 and/or one or more speakers. The display device 26 may be a touch-screen display and may be used as part of the input system 12.

In one aspect of the present invention, the external source 24 includes a communications network 24. The communications network 24 may be a two-way communications network (see below) for communicating with one or more one or more traffic control systems 25. The information system 10 may communicate vehicle data, such as the current position of the motor vehicle, progress of the vehicle along the planned route, and vehicle operational characteristics, to the traffic control system 25.

In one embodiment, the information system 10 coordinates the planned route and/or the alternative routes with the traffic control systems 25. For example, the traffic control system 25 may include at least one traffic control signal. The information system 10 may send a request the traffic control system 25 to control the at least one traffic control signal to minimize any impact of other traffic traveling along the planned route or the alternative route.

In another embodiment, the traffic control system may monitor the position of the motor vehicle along the planned or alternative route to alert, in a timely fashion, vehicular and/or pedestrian traffic of the approaching motor vehicle (see below). For example, the alert may be in the form of an audible alarm and/or an visual signal and/or other signal to be received by an appropriate device in other vehicles.

In another aspect the traffic control system 25 may include a railroad crossing system. The traffic control system 26 may monitor the position of the motor vehicle along the planned or alternative route and coordinate with the railroad crossing system. For example, the railroad crossing system may includes one or more bridges and/or one or more railroad crossing, which may be cleared or lifted to allow the motor vehicle to pass. It should also be noted that the inability for such to be cleared may be one of the factors communicated to the routing system 16.

The system 10 may also include a preference device 74, 132, 196 which may contain preference information related to an operator of the motor vehicle (see below). For example, the routing system 16 may establishing the planned route and/or alternate route as a function of the preference information.

In one aspect of the present invention, the display device 26 may graphically and/or textually display the planned route and/or the alternate route to the operator (see FIGS. 7–15). Alternatively, the communication system 18 may audibly communicate the planned route and/or the alternate route to the operator through the speaker(s) 28, such as in the form of instructors.

In one aspect of the present invention, the received information related to the factor (received over the network 24) may include a plurality of parameters which may affect the estimated time of arrival. For example, the plurality of parameters may include one or more of a location of factor, vector coordinates of factor, radial impact of factor, or gradient impact of factor (see below). As explained below, the routing system receives the receiving information related to the factor from an external system, such as a traffic control system. In another aspect of the present invention, the routing system 16 may be able to receive data, voice or entertainment services over any suitable network 24.

In another aspect of the present invention, the routing system 10 may monitor the current position of the motor vehicle, determine if the operator has not followed the planned route, and responsively modify the planned route as a function of the position of the motor vehicle (see below).

With specific reference to FIG. 2, a method 30 for providing information to an operator of a motor vehicle is shown. In a first step 32, a destination location of the motor vehicle and a current position of the motor vehicle is established. In a second step 34, a planned route is established and communicated to the operator or user. In a first decision block 36, if information is received related to a factor which may delay travel over the planned route, then the method 30 proceeds to a third step 38. Otherwise, the method 30 proceeds to a second decision block 42. In the third step 38, a new current position of the motor vehicle 38 is established and an new or alternative route is established in a fourth step 40. Control then proceeds to a third decision block 39. In the third decision block 39, it is determined if modifications to the route are needed. This may be based on the current position of the motor vehicle and the received factor, and if available, other information, such as data received from the traffic control systems 25. For example, if the factor would cause a significant delay in the motor vehicle reaching its destination (based on its current progress), then an alternative route may be needed. Furthermore, based on other traffic, there may or may not be a route around the cause of the factor which would result in a better arrival time.

If modifications are not needed, then the method 30 proceeds to the second decision block 42. In the fourth step 40, an alternative route is established based on the current position of the motor vehicle and the method proceeds to the second decision block 42.

In the second decision block 42, if the destination location has not been reached, then the method communicates with the traffic control system 41 the current location of the vehicle and the planned route if it has been modified. The method 30 then returns to the first decision block 36. Otherwise, the method 30 ends.

Figure 3B:
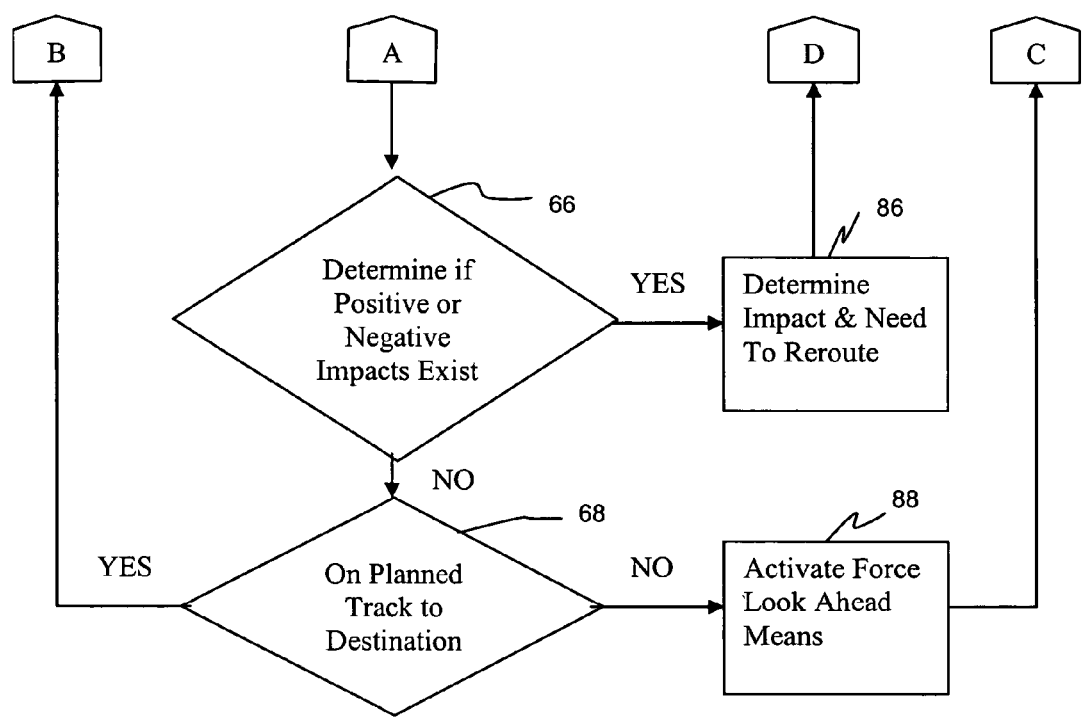
FIG. 3B is a second portion of the second flow diagram.
Figure 4A:
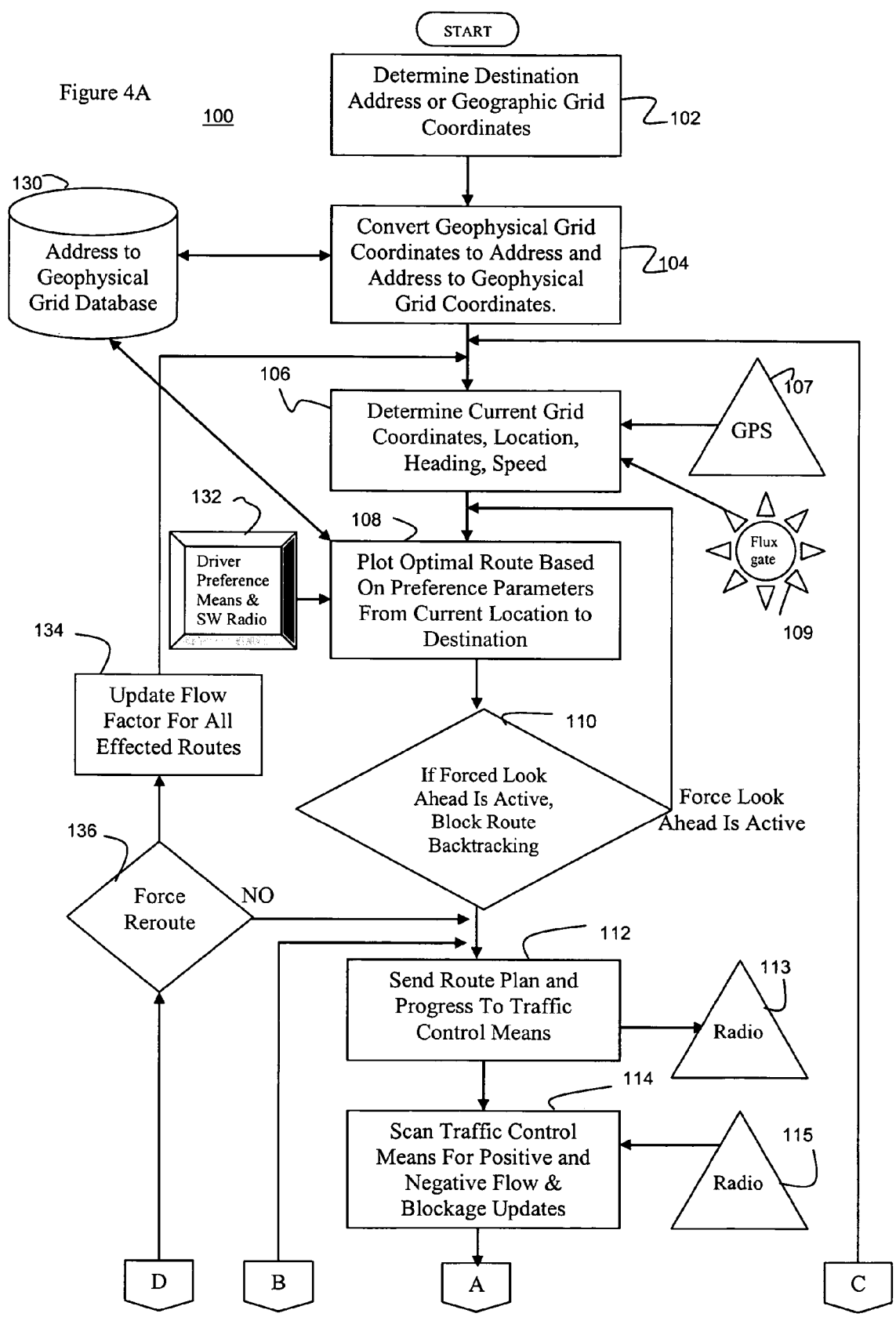
FIG. 4A is a first portion of a third flow diagram of a method for providing information to an operator of a motor vehicle, according to another embodiment of the present invention.
Figure 4B:
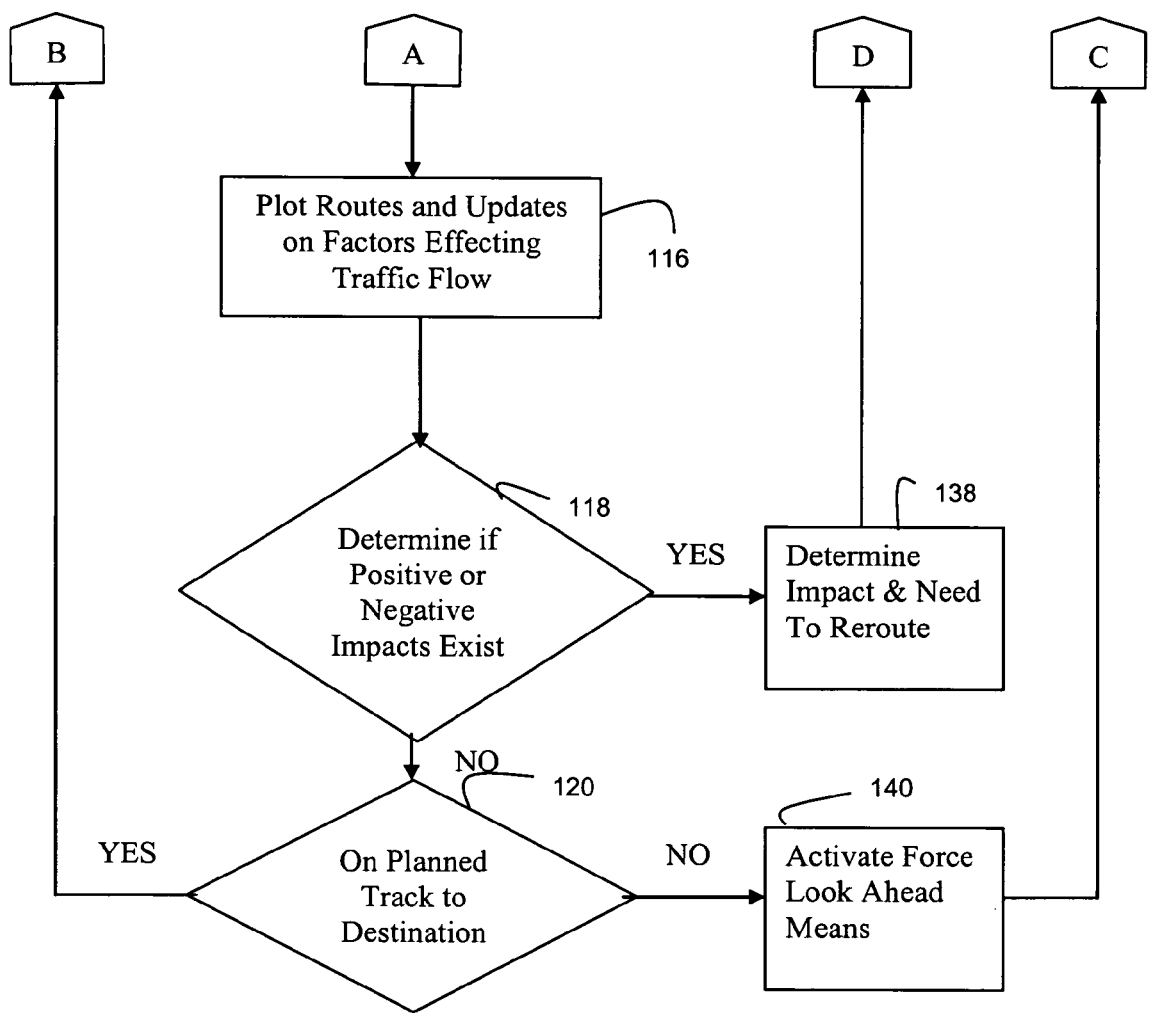
FIG. 4B is a second portion of the third flow diagram.
Figure 5A:
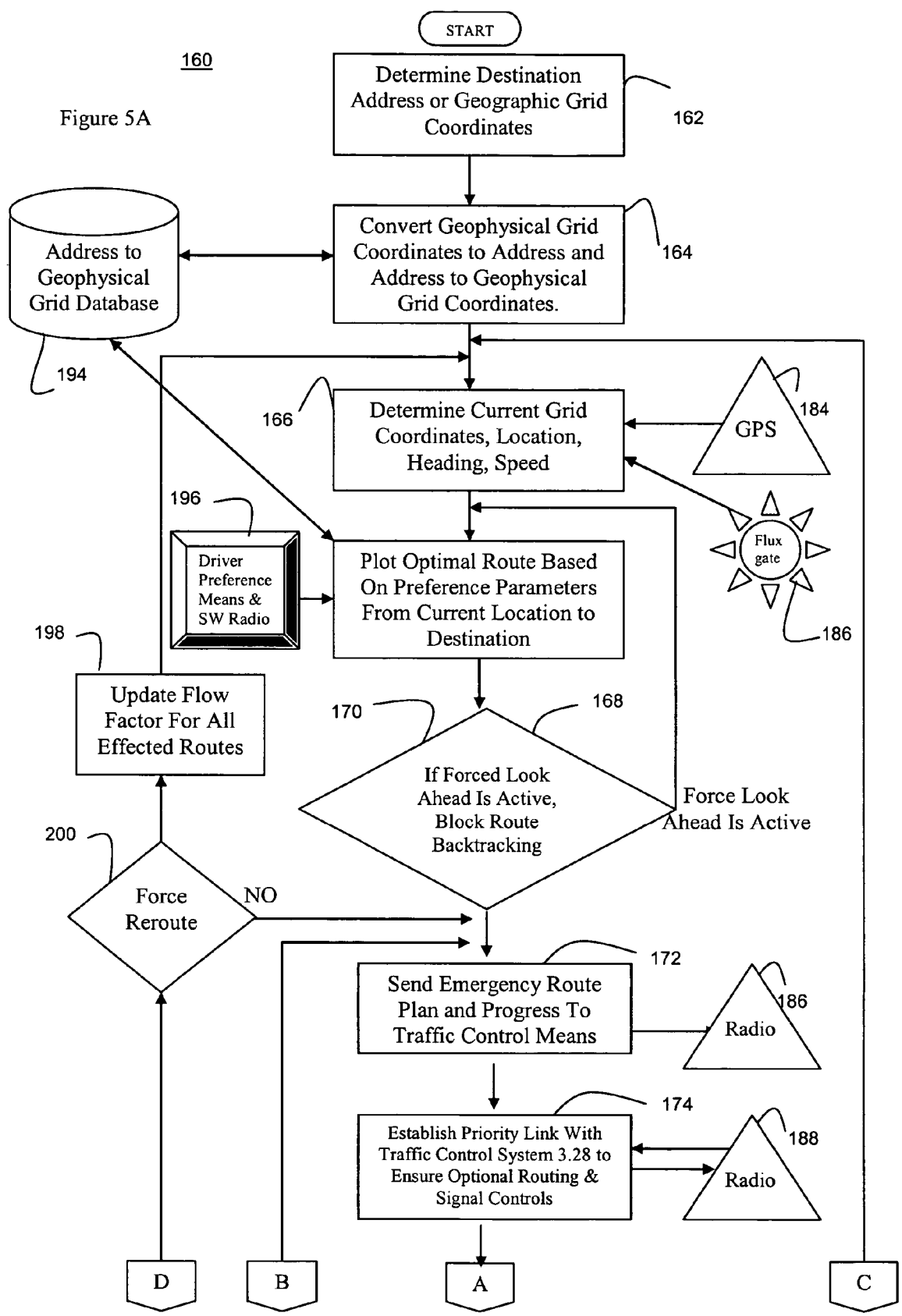
FIG. 5A is a first portion of a fourth flow diagram of a method for providing information to an operator of a motor vehicle, according to another embodiment of the present invention.
Figure 5B:
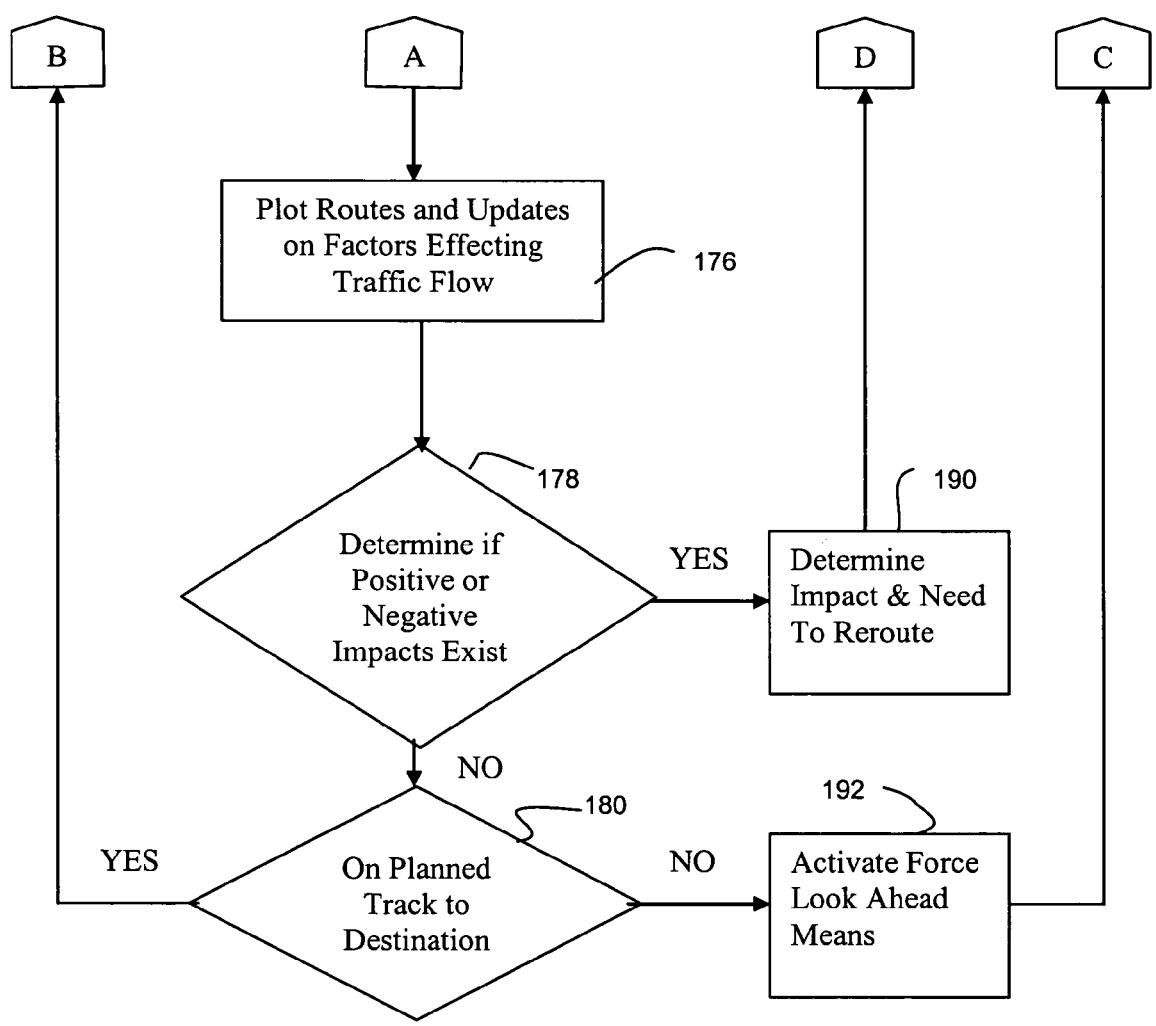
FIG. 5B is a second portion of the fourth flow diagram.
Figure 5C:
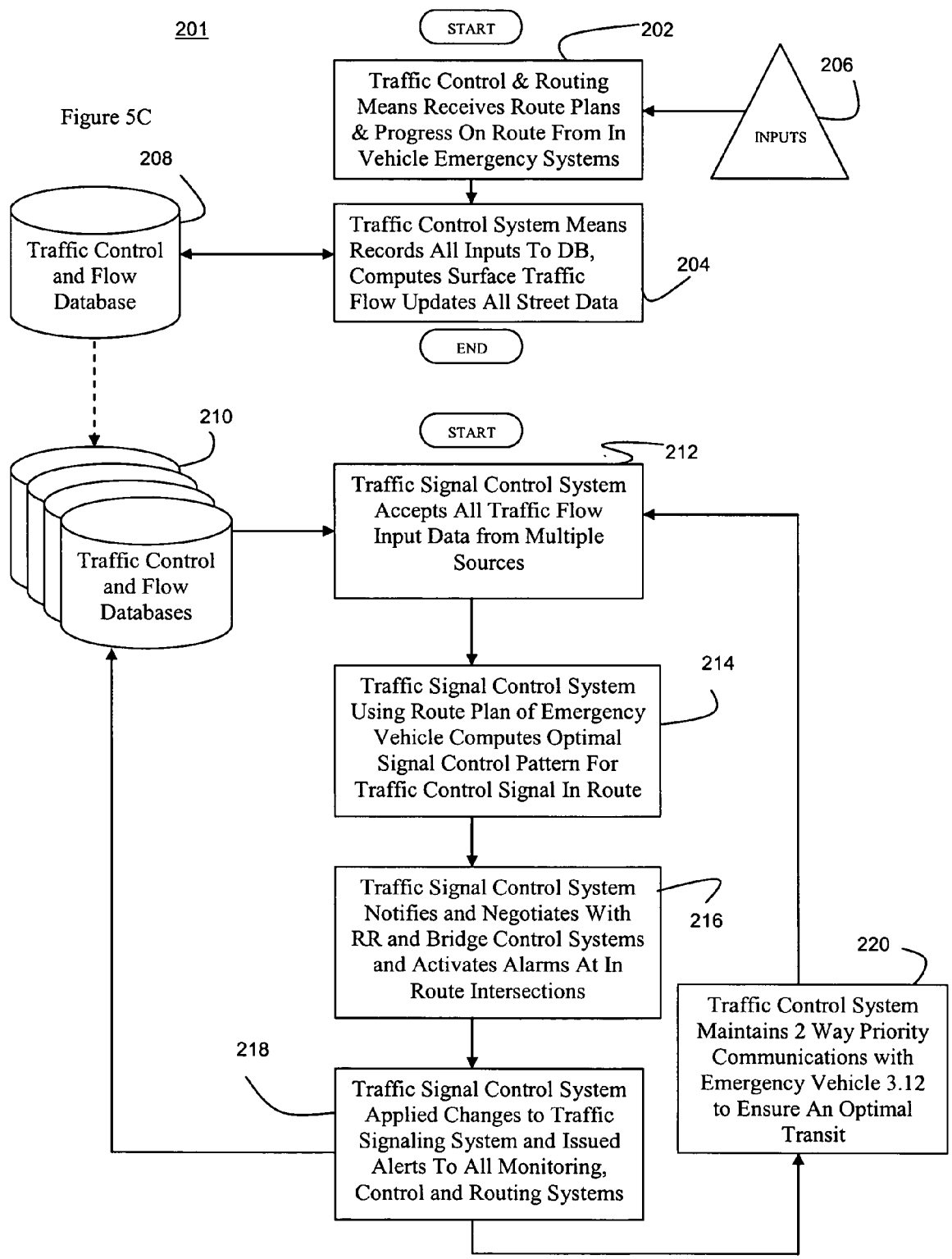
FIG. 5C is a third portion of the fourth flow diagram.

In one embodiment, the guidance system 10 may be configured to meet the needs and preferences of the person operating the vehicle through the use of a smart card or personal communications gateway 52 (see FIG. 3). The specifics of these authorization and configuration means is covered in more detail later. Properly configured and authorized, the system 10 will be capable of receiving over the network 24 in real time, updates on accidents, congestion and other conditions that would impede or improve the progress of the vehicle to the destination. This avoidance or clearance data permits the routing system 16 and process 30, to consider alternative routes in real time based on the current location and provide alternative routing to the operator. The network 24 to provide this interface would preferable be wireless and could be cellular, data wireless IP based like 802.11, sub carrier based off of standard broadcast radio, pager network based, digital land and/or satellite based, land mobile data radio based, software radio based and controlled or any other suitable or acceptable means sufficient to deliver input to the information system 10 permitting it to build the most efficient route to the destination.

As an alternative for repetitive or scheduled route planning for transports like public bus systems or commuters who travel the same route daily, a centralized route planning function could provide alternative route planning services and recommendations. These types of services would be ideally suited for incorporation into guidance systems integrated into in transport entertainment and radio system or any system having either an audio or visual display capable of text and graphical display.

The traffic control network could be operated by the DOT, local police or county traffic control departments, local radio or TV stations or may be a subscription based service offered by private companies. The network 24 for delivery of information, could be local, or operate over national networks like those available from land based and/or satellite radio providers like Sirius or XM Radio or other satellite based networks offering voice and/or data services. The information system 10 could be stand alone devices or could be integrated into vehicle radios, which would share the receiver for both audio entertainment and navigational purposes. These digital radios could also incorporate the synthesized voice for audio output and utilize their screens to display graphical and text data for navigational purposes. The system 10 could also be part of an overall in vehicle data system and network, used to control the vehicles operation as well as provide the passengers with access to mobile data networks providing two way data, voice and video services.

When in vehicle guidance systems gain sufficient acceptance by the public and sufficient numbers of them exist, the system 10 will support a 2-way communications network.

The information system 10 may use the positioning system 14, i.e., GPS or other suitable location sensing system, to provide real time feedback to a central traffic routing and control system. The system 10 may track at a minimum, the speed and direction of the vehicle and in a more enhanced version, would be capable of sensing and reporting on weather conditions, traction control conditions or any other sensor based condition that the system or vehicle was capable of supporting and reporting. With such real time inputs, the central traffic control system 10 would be capable of altering traffic control system parameters, like the posted speed limit, warning signs as well as traffic signaling and traffic lane directional control systems, to better regulate or improve the flow of traffic, thus reducing congestion as well as providing in vehicle guidance and navigation systems with needed data to perform route analysis and redirection as needed. In a more elaborate configuration, it could also generating an alert or alarm condition, which would cause traffic control cameras, observation aircraft or ground vehicles to be dispatched, to investigate the cause of the stoppage or slowdown. By improving both real-time from-the-field conditions with the sophisticated routing software and systems available, the performance of the overall guidance and navigation systems will be greatly improved.

It should be noted at this point that the 2-way communication system, while presented as being incorporated into the guidance system 10, might be incorporated into a vehicle in other forms. In its simplest form, the communication system 10 may be a speed and direction sensing system, which would be in the form of passive devices for example but not limited to RFID tags attached to or incorporated into a vehicle. It could take may forms such as being embedded into the vehicles license plate or incorporated into the vehicles inspection and renewal stickers. In what ever form it is embodied, it would be placed into a bus, taxi, police car, delivery vehicle or other forms of public or private transportation and as they pass monitoring points, they would supply additional input data points to the traffic control system. Unlike traditional traffic control inputs which simply track numbers of vehicles passing a sensor point, the RFID tag would permit tracking of individual vehicles progress along any number of routes and be better able to determine real traffic flow patterns, speeds and preferred routes. This RFID tag would also provide a means of tracking stolen or missing vehicles by associating a RFID tag identification number with a specific vehicle. The data captured by this flow monitoring and reporting system would be recorded in a database for use in dynamically routing vehicles and controlling traffic control devices and systems to improve overall traffic flows.

In more elaborate forms, the navigation and guidance system 10 may be an active reporting system, incorporated into the vehicles entertainment system, communications system or any other system in the vehicle that would accommodate the processor and communications needed. This would permit the sharing of on board vehicle resources like speaker, display units, microphones, input devices or key boards, power supplies, storage media, digital processors and communications systems. Devices such as cellular phones and PDA's represent some of the devices that could interface with the 2-way communications network. As car automation and computerization expands with integrated vehicle video entertainment systems, built in voice and data networking system and emergency alarm and detection systems such as GM OnStar, the incorporation of the one or two way traffic control guidance interface becomes increasingly easy while improving the overall driving experience. Adoption of planar array antennas into vehicle roofs, hoods or trunks to support high-speed data and video transmission from satellites and/or land based stations using technologies like the IEEE 802 LAN/MAN protocols all make transport of needed data streams easier and cost competitive.

Another feature of the interface to the traffic control system of the 2-way communicating system would be that it would not be necessary for it to always have coverage. The directional, speed and other data points gathered by the system 10 could be recorded in a memory associated with the system. When the system at a later time, comes into an area where 2-way communications are available, it would upload its historical data. In this way, the system 10 will work with what today are called hot spots or tele-points until a complete coverage network is available. It will also permit the system 10 to be developed with the concept that always on connectivity will never be a reality, and upload points would be placed strategically to gather data on the most active routes first and then the less traveled roads as needed. If deployed as a subscription service, it could as and example, be aligned with IEEE 802 LAN/MAN hot spots or CDMA data networks of cellular carriers. There is however no restriction or limitation as to how it could be deployed or packaged. Batch transfer of data will require that time and date stamps be incorporated into the message content so that old data could be purged either before transmitting by the on board tracking and reporting system or by the traffic control transceiver point. In either case, old data is of no use to the traffic control system other than for historical trending purposes. If the system design desires to have historical data for trending purposes, it can optionally be configured to send and record all data points captured by the system.

Many rental cars and production passenger vehicles now come equipped with a navigation or guidance systems that do not interface with an outside traffic control and reporting system over either a one or two way communications network. To improve on these non-interfacing systems and provide for portability of the routing service, the navigation or guidance system 10 can be equipped with a number of different communications ports over which information from a traffic control or reporting system can be delivered by other devices. An example would be a business person who carries a communicating PDA, Blackberry or other mobile computing and communications device or personal communications gateway or software radio and the means to configure, authorize and activate the device, can place their device into a cradle or other docking means that not only would have the option to power the communicating device but would also have the ability to initiate a communications session between the device and the navigation and or guidance system and cause it to use either the docked systems or the installed devices one or two way communications capabilities to gain data on local traffic conditions and provide the navigation and guidance systems with valuable additional data to enhance its routing capabilities.

The use of software radio systems, configured by an individual's preference and authorization means, like a smart card, an RFID tag, a bio-metrics detector and identification senor or device, a key entry device, a voice recognition device, a magnetic card reader, a ID chip, or any other identification means or combination of means, deemed reliable, secure and economically justified will permit greater flexibility and customization to meet the specific needs of each user. This same authorization means may be used to configure one or all in vehicle systems for guidance, routing, entertainment, data and voice systems to meet the preference means of the operator. Other systems that could be controlled by the individuals preference and authorization means include settings for one or more of the following: seat settings, mirror settings, climate control settings, peddle and steering wheel adjustments, suspension controls, dashboard illumination controls, radio station setting by type and or genre, seat heaters, traction control and or drive train.

The routing and information service could be a free publicly available service or a fee-based service provided by a service provider specializing in route planning. It should be noted that a device like a cell phone or PDA or any other communicating device with a display and or speaker and or microphone on a stand alone basis can deliver the complete navigation and guidance capability described above, the interfacing of the communicating device with an in vehicle navigation and or guidance system simply enhances the ability of the communicating device by expanding its display, processing power, position determination and ability to utilize the one or two way interface capabilities. In addition, it helps keep the unit cost of the cell phone or PDA or other communicating device down to a reasonable level by off loading features and functions it may not always need and place those in the navigation and or guidance system. Any communicating device would be a candidate to provide the necessary interface. As radio technology advances, communication systems are becoming more software controlled and will no longer be tied directly to a set piece of hardware to operate in a particular frequency or under a particular frequency usage scheme such as frequency hopping. Smart Cards or personal communications gateway devices, permitting access to wireless networks and services through adaptive circuits dynamically configured by software, will provide added flexibility and ease of use of these guidance and navigation systems. Through their use, users will be able transform basic guidance and navigation systems to meet their specific needs, access their preferences, utilize specific service providers and authorize and activate features and functions based on their level of service or subscription base. This dynamic configuration and authorization means will permit the base navigation control and guidance system as well an any other interfaced system in the vehicle to accept the necessary control parameters and intercommunications to all devices and network interfaces to meet the personal preferences of the user and interface wirelessly with the users preferred service providers for network, data, entertainment and voice services.

Appointments in calendaring programs, meeting notices or memos with addresses can be automatically retrieved and used by the guidance and or navigation system if so permitted by the communicating device, to direct the driver from their current location to the point of their meeting, to a hotel where they have a reservation or to the rental car agency once the meeting or trip is completed and the car is to be returned. The ability of the communicating device to share reservation and trip plans and itinerary data with the navigation and guidance system to improve the overall travel experience is another value added and convenience feature of the system and begins to expand the vision of the "personal digital assistant". The networks used to interface with the navigation and guidance system would be RF, Infrared, Optical or use any other medium that was considered suitable and reliable and met with interface standards. This capability would permit the end user to save route data in their personal device so that features like "most frequently called numbers" could be expended to include "most frequently visited destinations". These types of saved data could be stored in either the portable device or stored by the service provider and made available on demand over the network to the subscriber for use at any time. In addition to the above features, the interface will permit the end user device to utilize the power source, display, speaker and microphone of the navigation and or guidance system to deliver other services to the operator without causing them to have to remove their concentration while driving. An example of such a feature might be to read any unread e-mail to the driver while in transit or to read inbound text or voice mail messages to the driver. Another feature would be to use the wireless connection, to initiate a VOIP phone conversation with any appropriately enabled end point on the Internet leveraging the speakers and microphone of the navigation and or guidance system to deliver the valued added service of VoIP calling. In association with voice services, the network would also provide the ability to receive and display or read fax transmissions. Service provides like Net2Phone and Vonage are examples of companies capable of providing these types of services. This same system could be used to tract assets and people for any corporate, government or military organization or for the any other purpose or reason deemed necessary or logical. This includes tracking and reporting of personal versus business travel for tax proposes as well as corporate allocation of expenses relating to travel. Many other convenience and safety services can be delivered over this interface and therefore are not limited to the above example. An extended example could be the integration of an accident reporting system into the navigation and/or guidance system permitting it to notify authorities if an accident condition alarm is activated.

Surface vehicles are also susceptible to delays caused by railroad and marine traffic. Railroad traffic is managed by a central control center. As a result, the traffic control management system can obtain real time updates on scheduled and none scheduled railroad traffic, which will cause delays at railroad crossing. Unlike bridges, which are manned, railroad crossings operate automatically and therefore control of conflicts with traffic on the rails and the surface streets must be resolved at the traffic control centers for each medium. This is especially true when emergency vehicles are in route to an emergency and their planned route includes at least one railroad crossing. These conflicts can be managed at the control center level for each medium by rerouting the emergency vehicles or causing the railroad traffic to speed up or slow down to avoid the conflict and eliminate any computed pending conflict and delay. More problematic is marine traffic, which can cause delays in surface vehicle traffic when bridge opens are required, due to height clearance restrictions of passing vessels. While many bridges follow a schedule for openings, often unscheduled openings occur which result in unanticipated delays for surface vehicle traffic. A vessel tracking and bridge opening scheduler and alarming system is described here. This system could be used to track railroad traffic as well as marine traffic if the properties of the railroad control system do not adequately meet the needs of supplying sufficient real time data on train locations, speed and crossing ETA's of surface traffic streets. A vessel tracking and bridge opening scheduler and alarming system, is designed to monitor a beaconing transmitter aboard any marine vessel having a height clearance restriction sufficient to cause a request of a bridge opening to be required. Current marine protocol requires that ever vessel needing a bridge opening contact the bridge tender to request such an opening to be scheduled. Depending on the traffic conditions and the operating mode of the bridge, openings may only occur on a scheduled basis like every half hour or may occur on request as long as surface traffic is not excessive. Most bridges operate under a scheduled opening basis during peak surface traffic times and then revert to an on request schedule during none peak surface traffic times. The beaconing transmitter of each vessel is either a stand-alone device or is a hybrid combination of a radio transmitter, such as a standard VHF marine radio and a positions location system such as a global positioning satellite (GPS) system. Since most vessels today have a GPS receiver onboard for navigational purposes and most new VHF radios have an interface to a GPS receiver for distress reporting purposes, it is easy to envision that this same combination of radio and GPS which operates on channel 16 for emergencies could also operate on channel 9 which is the standard for bridge tender intercommunication voice traffic. The beaconing transmitter will transmit the vessels Identification, its position as a discrete latitude and longitude coordinate, its speed and direction. The Vessel Tracking and Bridge Opening and Alarming system at each bridge within the range of the vessels radio will compute a possibility of a crossing of the vessels track and bridge and also will calculate an estimated time of arrival of the vessel using the beaconing radios GPS data stream. The process it will go through is as follows.

1. The ID and position data of the vessel is first plotted mathematically against all known waterway navigation channels leading to and from the bridge. Since waterways like railroad tracks follow a specific course and location, it will be easy to determine if the vessel is on a waterway that intersects with the bridge.

2. If the vessel is determined not to be on a course with the bridge the message is deleted and any other inbound message in the radio receivers queue is processed.

3. If the vessel is determined to be on a course with the bridge, the speed over ground, location and direction are used to determine mathematically if the vessel is headed towards the bridge or away from it. If it is headed away from it, the message is deleted and any other inbound message in the radio receivers queue is processed.

4. If the vessel is on a course with the bridge and is headed towards the bridge, the speed of the vessel and its location are used to compute an estimated time of arrival at the bridge.

5. The estimated time of arrival is then posted to a log file in a form that will allow the bridge tender to review them and communicate with the vessel using either an automated text of voice system informing them of the next scheduled opening time and any special instruction necessary to maintain a safe and orderly condition in the waterway and in the area immediately surrounding the bridge. Such information may be a recommendation to slow or speed up their approach so as to better time their arrival for the scheduled or non-scheduled opening. I may include instructions to hold behind another vessel that is in front of them in the queue of vessels awaiting the opening. It may also include instructions about which side of the bridge's water way will be give first rights to pass through the bridge once it is opened. Priority is almost always given to vessels how have a current to their stems traveling downriver due to their restricted or diminished ability to maneuver, to vessels who are burdened such as large barge tows or tugs and to vessels who are experiencing mechanical difficulties. Many factors enter into this complex queuing process making the Vessel Tracking and Bridge Opening Scheduler and Alarming system a valuable tool for bridge tenders to manage a safe and orderly process much like an air traffic controller must do for at a busy airport.

6. As the bridge tender manages all vessel traffic requiring a bridge opening, the planned opening time, estimated duration of the opening will be posted to the traffic control system or posted to a data repository used by traffic control systems and vehicle routing and guidance systems to make them aware of the scheduled opening and its estimated duration.

7. As an opening occurs and is in process, the bridge tender will update their postings to the traffic control systems or data repositories as needed. Updates to the estimated duration time and the time of completion will be posted along with a final posting at the completion of the opening with an indication of the traffic delay created as a result of the opening. The surface traffic delay factor can be computed using electronic sensors on the surface street approaches to the bridge or through visual observations.

8. Because there is a direct like between the bridge tenders Vessel Tracking and Bridge Opening Scheduler and Alarming system. The bridge tender will be notified by the traffic control system if an emergency vehicle is in route to an emergency and will need to cross the bridge. This information along with an estimated time of arrival of the emergency vehicle, update in real time, will be included in the bridge scheduling system permitting the bridge tender to either delay the opening or cause the emergency vehicle to be rerouted if possible. This communication and control is possible do to the intercommunications capabilities of the various traffic routing and control systems covered in this disclosure.

A more elaborate embodiment of the invention is now presented which will build on the communication interfaces to the traffic control and monitoring and data collection system. This elaboration will bring together the network, the capabilities of the in-vehicle guidance and navigation system (in whatever form meets the specific needs of the application) and the data interchange with the traffic control system. These elements are combined to provide public safety and security vehicles and personnel with an exemplary means of improving their response time in an emergency.

As is the case with most in-vehicle guidance and navigation systems, a destination location is required along with a current location fix to commence the processing of route planning and navigational guidance. By the very nature of a positional location system, the in-vehicle system will always maintain a fix as to its current location, direction and speed. When an emergency alarm occurs, the physical address or location of the event can either be entered into the in-vehicle navigation or guidance system manually through a number of input means including voice recognition or it can be transmitted to it over any suitable network by the dispatch person, system or function which receives the emergency alarm or alert. As described above in the one and two-way communicating system descriptions, the system (either the in-vehicle or traffic control system), will determine the best possible route to the target location and will initiate the first set of directions to the driver. It should be noted that in an emergency response vehicle, a visual display of the route may be helpful but an audio directional system will permit the driver to maintain full attention to the road and keep from having their attention diverted to look at a video screen. Once initiated, the onboard guidance and navigation system will initiate a communications session with the traffic control system and operator, the dispatch system and operator, the driver and any other system or person required to complete the following step, to facilitate the routing of the vehicle and response personnel from the point of origin to any number of destinations. The communications session, people and systems involved will:

1. Share real time, information on the location, speed and direction of the vehicle.

2. Share real time, information on the vehicles initial intended route.

3. Share real time, information on any known delays or obstruction along the planned route or any flow patterns that indicate a better route may be possible based on the initially defined route. This will include any and all railroad crossing locations and railroad control centers, which route train traffic, as well as bridge tenders who control the open and closing of drawbridges, to permit boat traffic with height restrictions to pass.

4. Pass real time information from any authorized system or person to the onboard system to recommend changes in or overriding of the planned route.

5. Cause the onboard guidance and or navigation system to either compute a new route from its current location to the destination or accept a new route from any authorized system on the network as a result of known obstructions, congestion or delays, and relay that new route to all systems on the network.

6. Cause the onboard guidance and or navigation system to either compute a new route from its current location to the destination or accept a new route from any authorized system on the network from its current location to the destination, as a result of the driver not following the designated route. This dynamic re-route would occur as a result of unknown obstructions in the planned route, which cause the driver to abort the designed route and take an alternate route.

7. Cause the original planned and or modified routes to be shared with the traffic control system or systems having control over traffic signaling devices along the planned and or modified route. These plans along with the location, speed and direction data pertaining to the vehicle following that route, will cause the traffic control system to perform whatever changes in state are necessary to ensure that all in route control signals, systems or devices are in a state, in sufficient time, to minimize or eliminate any traffic, congestion or in route delays. Timing of the traffic control devices at intersections is accomplished by the in-vehicle system, which makes every intersection on the planned route a waypoint in the route. As the vehicle travels along the planned route and applies dynamic changes, the estimated time of arrival will be computed and reported to the traffic control system for each intersection waypoint by the in-vehicle system, making the traffic control system aware of the estimated time of arrival of the vehicle at each intersection thus improving and overall efficiency and safety of the system. With sufficient data relating to the route and estimated times of arrival at each intersection, the traffic control system can effectively provide notification to vehicles and pedestrians along the route and ensure that traffic control are in the best state to ensure the most expedient transit of the emergency vehicle or vehicles.

8. The traffic control system being aware of the route and the vehicles progress along the route as well as any changes thereto will activate visual and audible alarms, strobes, horns, bells, flashing lights or directional arrows and signage along the route with sufficient time to notify vehicular and pedestrian traffic in the area of the approaching emergency vehicle, indicating its direction and eminent presence.

9. In the future, as vehicles come equipped with systems capable of receiving data related to the presence of an emergency vehicle, its route and location, they will either audible or visually alert the driver of its presence. This ability will be embedded into systems capable of receiving and processing signals like a radio or entertainment system. Today systems like radar detection systems already possess such capabilities. More advanced vehicle navigation and guidance systems will be able to alter their planned route to avoid any possible interference with the planned path of the emergency vehicle if such a feature is desired.

With reference to FIGS. 3A–3B, 4A–4B, 4C, and 5A–5C, a method 50 for providing a guidance and routing system 10 using a one way communications network 24, a method 100 a guidance and routing system 10 using a two way communications network 24, a method 141 for providing traffic control and routing using a two way communications network 24, a method 160 for providing emergency vehicle guidance and routing using a two way communications network 24, and a method 201 for providing traffic control and routing for emergency vehicles using a two way communications network 24, is shown.

The guidance system 10 is configured to meet the needs and preferences of the person operating the vehicle through the use of a smart card or personal communications gateway which can include a software radio 74, 132, 196. The specifics of these authorization and configuration means are covered in more detail later. Properly configured and authorized, the system 10 will be capable of being giving a destination 52, 102, 163, computing a route to the destination 58, 108, 168, using directional and location device like GPS 80, 107, 182 and/or Flux Gate compasses 82, 109, 184 and receiving over a network in real time, updates on accidents, congestion and other conditions that would impede or improve the progress of the vehicle to the destination 62. This avoidance or clearance data permits the routing system 10 and process, to consider alternative routes in real time 66, 118, 178 based on the current location and provides alternative routing 78, 136, 200 to the driver. The network 24 to provide this interface 74, 132, 196, 84, 113, 115, 186, 188, may be wireless, such as cellular, data wireless IP based like 802.11, sub carrier based off of standard broadcast radio, pager network based, digital land and/or satellite based, land mobile data radio based, software radio based and controlled or any other suitable or acceptable means sufficient to deliver input to the guidance system 10 permitting it to build the most efficient route to the destination. The system 10 also is capable of dynamic rerouting if the driver deviates from the planned route 68, 128, 180 and based on preferences 74, 132, 196, can force a look ahead only planning process 60, 110, 170, 88, 140, 192 if back tracking to the original route is not a preferred option. As an alternative for repetitive or scheduled route planning for transports like public bus systems or commuters who travel the same route daily, a centralized route planning function could provide alternative route planning services and recommendations 64, 116, 176. These types of services would be ideally suited for incorporation into guidance systems integrated into in transport entertainment and radio system or any system having either an audio or visual display capable of text and graphical display.

The traffic control network 62 can be operated by the DOT, local police or county traffic control departments, local radio or TV stations or may be a subscription based service offered by private companies. The network interface means Drawing 1a—74, 132, 196, 84, 113, 115, 186, 188 for receiving traffic flow factors, and its associated network, can be local, or operate over national networks like those available from land based and/or satellite radio providers like Sirius or XM Radio or other satellite based networks offering voice and/or data services. The guidance control system Drawings 1a & 1b can be stand alone devices or can be integrated into vehicle radios, which would share the receiver for both audio entertainment and navigational purposes.

Vehicle guidance systems supporting 2-way communications network are illustrated in FIGS. 4A–4C and 5A–5B. These guidance systems 10 use GPS 107, 182 or other suitable location sensing systems to provide real time feedback to a central traffic routing and control system 112, 113. The system 10 may track at a minimum, the speed and direction of the vehicle and in a more enhanced version, would be capable of sensing and reporting on weather condition, traction control conditions or any other sensor based condition that the system or vehicle is capable of supporting and reporting. With such real time inputs 112, 146, the central traffic control system is capable of altering traffic control system parameters 150, 152, 154, 156, like the posted speed limit, warning signs as well as traffic signaling and traffic lane directional control systems, to better regulate or improve the flow of traffic, thus reducing congestion as well as providing in vehicle guidance and navigation systems with needed data Drawing 148, 150 to perform route analysis and redirection 116, 118, 120, 138, 140 as needed. In a more elaborate configuration, it could also generating an alert or alarm condition, which would cause traffic control cameras, observation aircraft or ground vehicles to be dispatched, to investigate the cause of the stoppage or slowdown 156. By improving both real-time from-the-field conditions with the sophisticated routing software and systems available today, the performance of the overall guidance and navigation systems will be greatly improved.

It should be noted at this point that the 2-way communicating system, while presented as being incorporated into a guidance system, would be incorporated into a vehicle in other forms (not illustrated in drawings). In its simplest form, it would be a speed and direction sensing system, which would be in the form of passive devices for example but not limited to RFID tags attached to or incorporated into a vehicle. It could take may forms such as being embedded into the vehicles license plate or incorporated into the vehicles inspection and renewal stickers. In what ever form it is embodied, it can be placed into a bus, taxi, police car, delivery vehicle or other forms of public or private transportation and as they pass monitoring points, they will supply additional input data points to the traffic control system 150, 212. Unlike traditional traffic control inputs which simply track numbers of vehicles passing a sensor point, the RFID tag would permit tracking of individual vehicles progress along any number of routes and be better able to determine real traffic flow patterns, speeds and preferred routes 150, 212. This RFID tag would also provide a means of tracking stolen or missing vehicles by associating a RFID tag identification number with a specific vehicle. The data captured by this flow monitoring and reporting system would be recorded in a database 148 for use in dynamically routing vehicles and controlling traffic control devices and systems 150, 152, 154, 156, 212, 214, 216, 218, 220 to improve overall traffic flows.

In more elaborate forms, the navigation and guidance system would be an active reporting system (not illustrated in drawings), incorporated into the vehicles entertainment system, communications system or any other system in the vehicle that would accommodate the processor and communications needed. This would permit the sharing of on board vehicle resources like speaker, display units, microphones, input devices or key boards, power supplies, storage media, digital processors and communications systems. Devices such as cellular phones and PDA's represent some of the devices that could interface with the 2-way communications network and act as a shared communications bridge. As car automation and computerization expands with integrated vehicle video entertainment systems, build in voice and data networking system and emergency alarm and detection systems such as GM OnStar, the integration of the one or two way traffic control guidance interface (see FIGS. 3A, 3B, 4A, 4B, 4C, 5A, 5B, 5C) becomes increasingly more cost justified while improving the overall driving experience. Adoption of planar array antennas into vehicle roofs, hoods or trunks to support high-speed data and video transmission from satellites and/or land based stations using technologies like the IEEE 802 LAN/MAN protocols all make transport of needed data streams easier and cost competitive.

Figure 6:
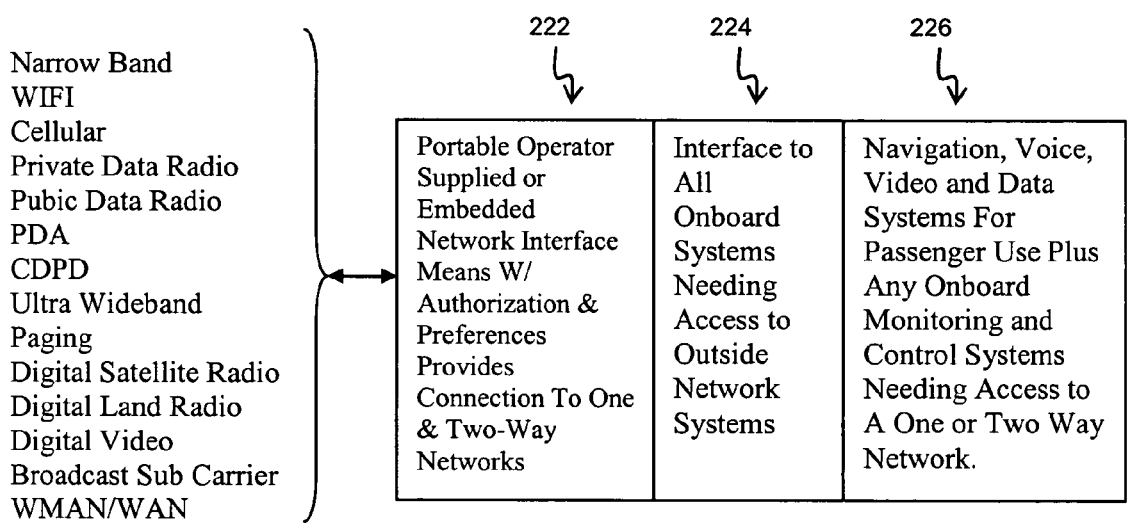
FIG. 6 is a table related to system and method for providing information to an operator of a motor vehicle.

Many rental cars and production passenger vehicles now come equipped with a navigation or guidance systems that do not interface with an outside traffic control and reporting system (see FIG. 6), over either a one or two way communications network. To improve on these non-interfacing systems and provide for portability of the routing service, the navigation or guidance system can be equipped with a number of different communications ports (see FIG. 6) over which information from a traffic control or reporting system can be delivered by other devices 222, 74. An example would be a business person who carries a communicating PDA, Blackberry or other mobile computing and communications device or personal communications gateway or software radio and the means to configure, authorize and activate the device, can place their device into a cradle or other docking means that not only would have the option to power the communicating device but would also have the ability to initiate a communications session 222 between the device and the navigation and or guidance system and cause it to use either the docked systems or the installed devices one or two way communications capabilities to gain data on local traffic conditions and provide the navigation and guidance systems with valuable additional data to enhance its routing capabilities (see FIG. 6).

The use of software radio systems, configured by an individuals preference and authorization means 74, 132, 196, like a smart card, an RFID tag, a bio-metrics detector and identification senor or device, a key entry device, a voice recognition device, a magnetic card reader, a ID chip, or any other identification means or combination of means, deemed reliable, secure and economically justified will permit greater flexibility and customization to meet the specific needs of each user. This same authorization means will be used to configure one or all in vehicle systems for guidance, routing (58, 108, 168), entertainment, data and voice systems (not shown in drawings) to meet the preference means of the operator. Other systems that could be controlled by the individuals preference and authorization means include settings for one or more of the following: seat settings, mirror settings, climate control settings, peddle and steering wheel adjustments, suspension controls, dashboard illumination controls, radio station setting by type and or genre, seat heaters, traction control and or drive train.

The routing and information services (see FIGS. 4A, 4B, 4C and FIGS. 5A, 5B, 5C), can be free publicly available services or fee-based services, provided by a service organization specializing in route planning. It should be noted that a device like a cell phone or PDA or any other communicating device with a display and or speaker and or microphone on a stand alone basis can deliver the complete navigation and guidance capability described above. The interfacing of the communicating device with an in vehicle navigation and or guidance system (see FIG. 6), simply enhances the ability of the communicating device by expanding its display, processing power, position determination and ability to utilize the one or two way network interface capabilities. Smart Cards or personal communications gateway devices 74, 132, 196, permitting access to wireless networks and services through adaptive circuits dynamically configured by software, will provide added flexibility and ease of use of these guidance and navigation systems. Through their use, users will be able to transform basic guidance and navigation systems to meet their specific needs, access their preferences, utilize specific service providers and authorize and activate features and functions based on their level of service or subscription base. This dynamic configuration and authorization means Drawing 9 will permit the base navigation control and guidance system as well an any other interfaced system in the vehicle 226 to accept the necessary control parameters and intercommunications to all devices and network interfaces 224, to meet the personal preferences of the user and interface wirelessly with the users preferred service providers 222, for network, data, entertainment and voice services.

Appointments in calendaring programs, meeting notices or memos with addresses can be automatically retrieved and used by the guidance and or navigation system if so permitted by the communicating device Drawing 74, 132, 196, to direct the driver from their current location to the point of their meeting, to a hotel where they have a reservation or to the rental car agency once the meeting or trip is completed and the car is to be returned. The ability of the communicating device to share reservation and trip plans and itinerary data with the navigation and guidance system to improve the overall travel experience is another value added and convenience feature of the system and begins to expand the vision of the "personal digital assistant". The networks Drawing 9-9.1, used to interface with the navigation and guidance system Drawing 226, would be RF, Infrared, Optical or use any other medium that was considered suitable and reliable and met with interface standards. This capability would permit the end user to save route data in their personal device 74, 132, 196, so that features like "most frequently called numbers" could be expended to include "most frequently visited destinations".

Surface vehicles are also susceptible to delays caused by railroad and marine traffic. Railroad traffic is managed by a central control center. As a result, the traffic control management system can obtain real time updates on scheduled and none scheduled railroad traffic 154, 216, which will cause delays at railroad crossings. Unlike bridges, which are manned, railroad crossings operate automatically and therefore control of conflicts with traffic on the rails and the surface streets must be resolved at the traffic control centers for each medium. This is especially true when emergency vehicles are in route to an emergency and their planned route includes at least one railroad crossing. These conflicts can be managed at the control center level for each medium by rerouting the emergency vehicles 66, 138, 190, or causing the railroad traffic to speed up or slow down to avoid the conflict and eliminate any computed pending conflict and delay 156, 218. More problematic is marine traffic, which can cause delays in surface vehicle traffic when bridge opens are required, due to height clearance restrictions of passing vessels. While many bridges follow a schedule for openings, often unscheduled openings occur which result in unanticipated delays for surface vehicle traffic. A system 10 for vessel tracking and bridge opening, scheduling and alarm is described here (FIGS. 7–15). This system 10 is used to track railroad traffic as well as marine traffic if the properties of the railroad control system do not adequately meet the needs of supplying sufficient real time data on train locations, speed and crossing ETA's of surface traffic streets. The vessel tracking and bridge opening scheduler and alarming system 10, is designed to monitor a beaconing transmitter aboard any marine vessel 8.1, 7.1, having a height clearance restriction sufficient to cause a request of a bridge opening to be required Drawing 8.2, 7.2. Current marine protocol requires that ever vessel needing a bridge opening contact the bridge tender to request such an opening to be scheduled. Depending on the traffic conditions and the operating mode of the bridge, openings may only occur on a scheduled basis like every half hour or may occur on request as long as surface traffic is not excessive. Most bridges operate under a scheduled opening basis during peak surface traffic times and then revert to an on request schedule during none peak surface traffic times. The beaconing transmitter of each vessel 8.1, 7.1, is either a stand-alone device or is a hybrid combination of a radio transmitter, such as a standard VHF marine radio and a positions location system such as a global positioning satellite (GPS) system. Since most vessels today have a GPS receiver onboard for navigational purposes and most new VHF radios have an interface to a GPS receiver for distress reporting purposes, it is easy to envision that this same combination of radio and GPS which operates on channel 16 for emergencies could also operate on channel 9 which is the standard for bridge tender intercommunication voice traffic. The beaconing transmitter will transmit the vessels Identification, its position as a discrete latitude and longitude coordinate, its speed and direction and produce vector coordinates of its projected path Drawing 7.5 or for railroads 7.6. Using this data, the Vessel Tracking and Bridge Opening and Alarming system will compile all vessels needing an opening and compute the impact the during and time of the opening will have on surface traffic and generate a Radial Impact Zone and Level of Impact Gradient for surface traffic Drawing 10.5 and posts this information to the surface traffic control system database 210. The Vessel Tracking and Bridge Opening and Alarming system at each bridge within the range of the vessels radio will compute a possibility of a crossing of the vessels track and bridge and also will calculate an estimated time of arrival of the vessel using the beaconing radios GPS data stream. The process it will go through is as follows.

1. The ID and position data of the vessel is first plotted mathematically against all known waterway navigation channels leading to and from the bridge. Since water ways like railroad tracks follow a specific course and location, it will be easy to determine if the vessel 7.1 is on a water way that intersects with the bridge 7.2.

2. If the vessel is determined not to be on a course with the bridge the message is deleted and any other inbound message in the radio receivers queue is processed.

3. If the vessel is determined to be on a course with the bridge, the speed over ground, location and direction are used to determine mathematically if the vessel is headed towards the bridge or away from it 7.5 Route Vector. If it is headed away from it, the message is deleted and any other inbound message in the radio receivers queue is processed.

4. If the vessel is on a course with the bridge and is headed towards the bridge 7.5, the speed of the vessel and its location are used to compute an estimated time of arrival at the bridge and the Radial Impact of the bridge opening 10.5.

5. The estimated time of arrival is then posted to a log file in a form that will allow the bridge tender to review them and communicate with the vessel using either an automated text or voice system informing them of the next scheduled opening time and any special instruction necessary to maintain a safe and orderly condition in the waterway and in the area immediately surrounding the bridge. Such information may be a recommendation to slow or speed up their approach so as to better time their arrival for the scheduled or non-scheduled opening. It may include instructions to hold behind another vessel that is in front of them in the queue of vessels awaiting the opening. It may also include instructions about which side of the bridge's water way will be given first rights to pass through the bridge once it is opened. Priority is almost always given to vessels with a current to their stems traveling downriver due to their restricted or diminished ability to maneuver, to vessels who are burdened such as large barge tows or tugs and to vessels who are experiencing mechanical difficulties. Many factors enter into this complex queuing process making the Vessel Tracking and Bridge Opening Scheduler and Alarming system a valuable tool for bridge tenders to manage a safe and orderly process much like an air traffic controller must do for at a busy airport.

6. As the bridge tender manages all vessel traffic requiring a bridge opening, the planned opening time, estimated duration of the opening will be posted to the traffic control system 156, 216 or posted to a data repository used by traffic control systems 148, 208, 210 and vehicle routing and guidance systems to make them aware of the scheduled opening and its estimated duration.

7. As an opening occurs and is in process, the bridge tender will update their postings to the traffic control systems 154, 216 or data repositories 148, 208, 210, as needed. Updates to the estimated duration time and the time of completion will be posted along with a final posting at the completion of the opening with an indication of the traffic delay created as a result of the opening. The surface traffic delay factor can be computed using electronic sensors on the surface street approaches to the bridge or through visual observations.

8. Because there is a direct link between the bridge tenders Vessel Tracking and Bridge Opening Scheduler & Alarming system. The bridge tender will be notified by the traffic control system if an emergency vehicle is in route 156, 218 to an emergency and request they cross the bridge as soon as possible. This information along with an estimated time of arrival of the emergency vehicle, update in real time, will be included in the bridge scheduling system permitting the bridge tender to either delay the opening, terminate the opening or cause the emergency vehicle to be rerouted as a last resort. This communication and control is possible do to the intercommunications capabilities of the various traffic routing and control systems 150, 212 covered in this disclosure.

Figure 7:
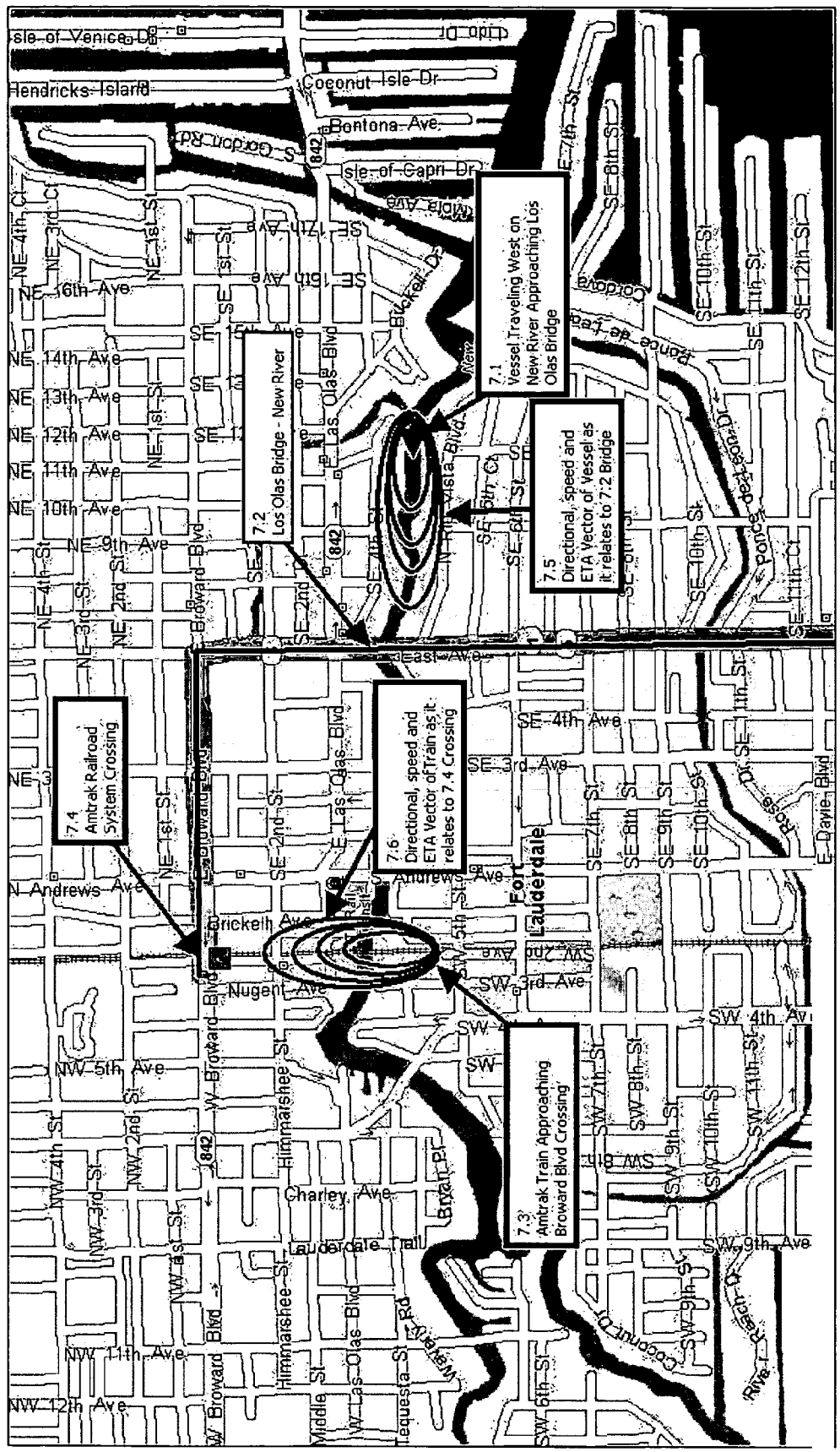
FIG. 7 is a first view of a map illustrating operation of the present invention.

FIGS. 7–15 illustrate include a planned route (see FIG. 8) from a location (1) to a destination (2) in the City of Fort Lauderdale. The in vehicle guidance system 10 plots a route shown (see FIG. 13) which travels down State Road 84 East then North on US1 then West on Broward Blvd to the destination 3 block west of City Hall. The original route is 4.3 miles and is estimated to take 7 minutes. In FIG. 7–15, a vessel traveling West on the New River using the Vessel Tracking and Bridge Opening Scheduler and Alarming system appears as figure N.1 (where N is the Figure number). Thus, in FIG. 7, the vessel is labeled 7.1. The vessel's route will take it to a point where a bridge exists at figure N.2 in all drawings in this series. In FIG. 7, the bridge is labeled 7.2. A train is also illustrated as traveling north, paralleling SW 2nd Avenue and is labeled N.3, so in FIG. 7, it appears as 7.3.

In FIGS. 7–15, there are three series of events.

Figure 8:
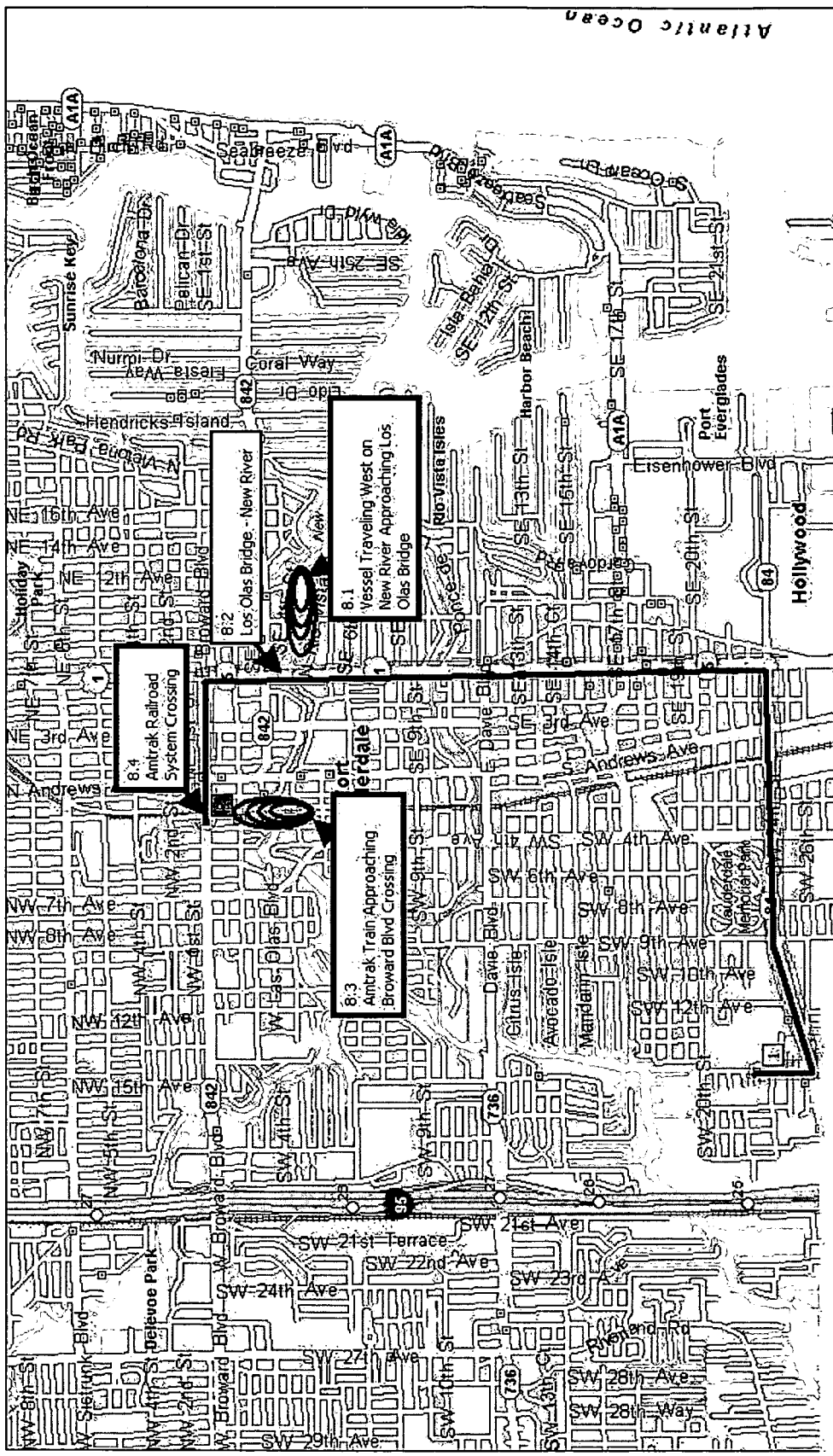
FIG. 8 is a second view of the map of FIG. 7.
Figure 9:
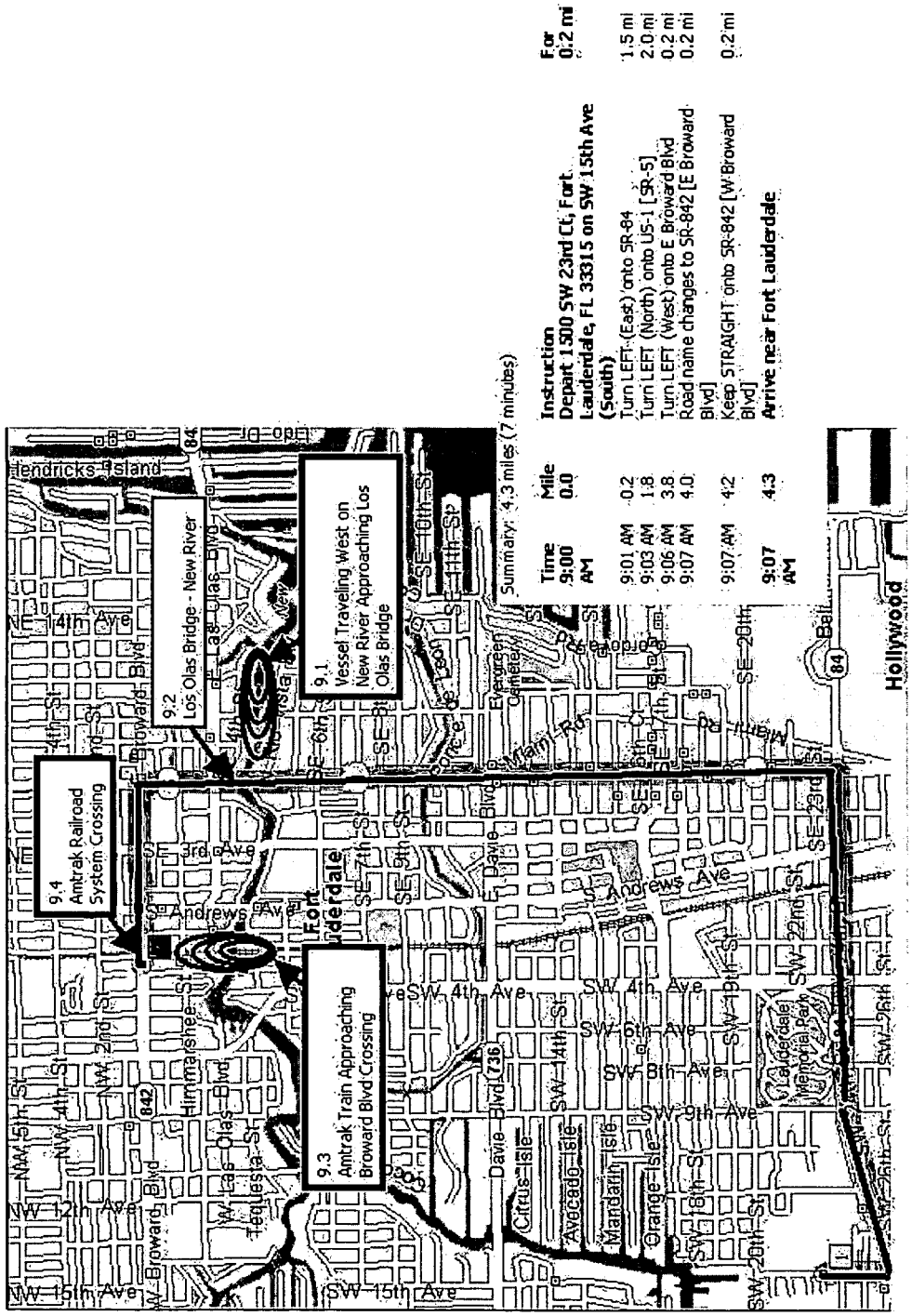
FIG. 9 is a third view of the map of FIG. 7.
Figure 13:
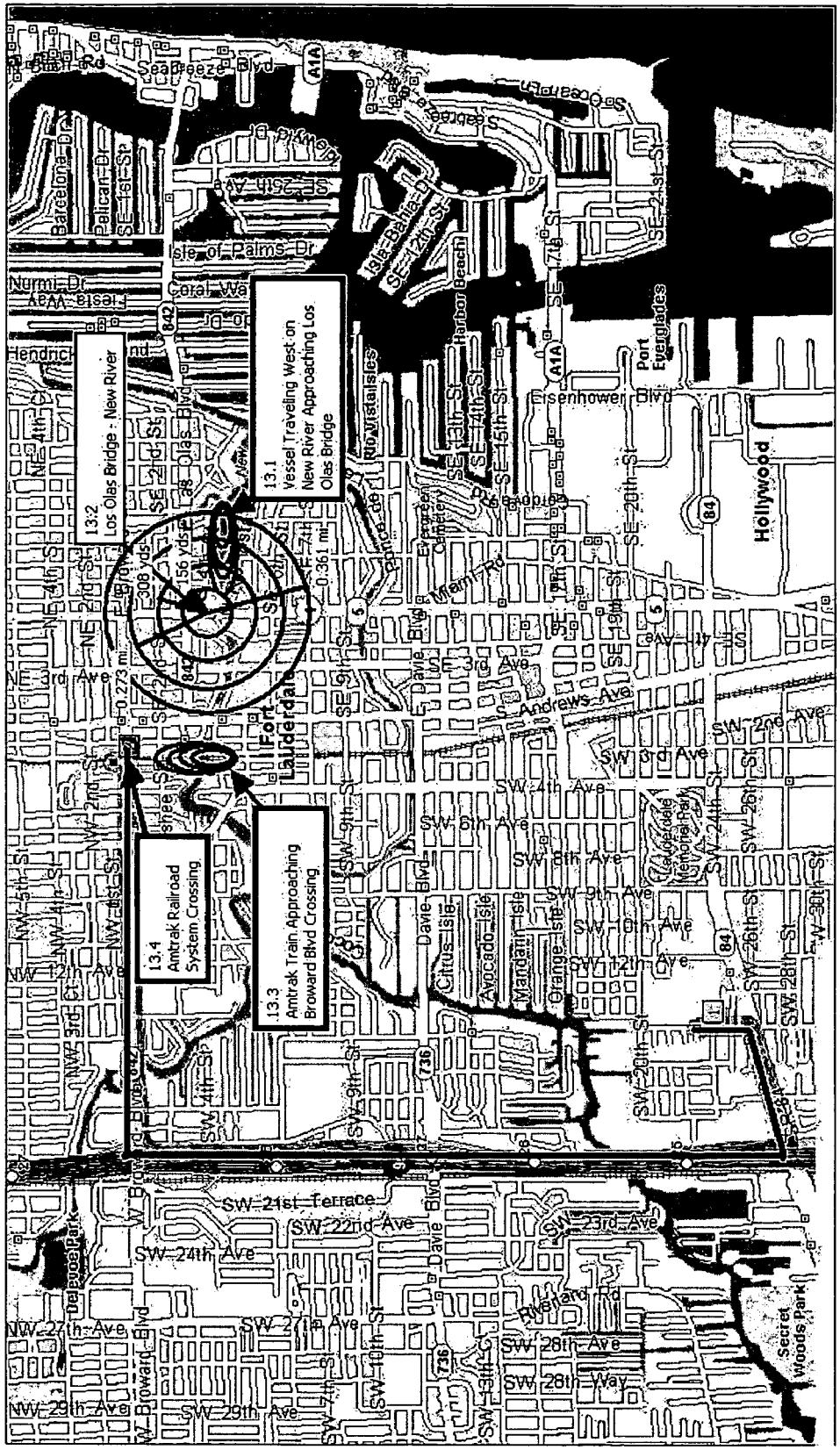
FIG. 13 is a seventh view of the map of FIG. 7.
Figure 14:
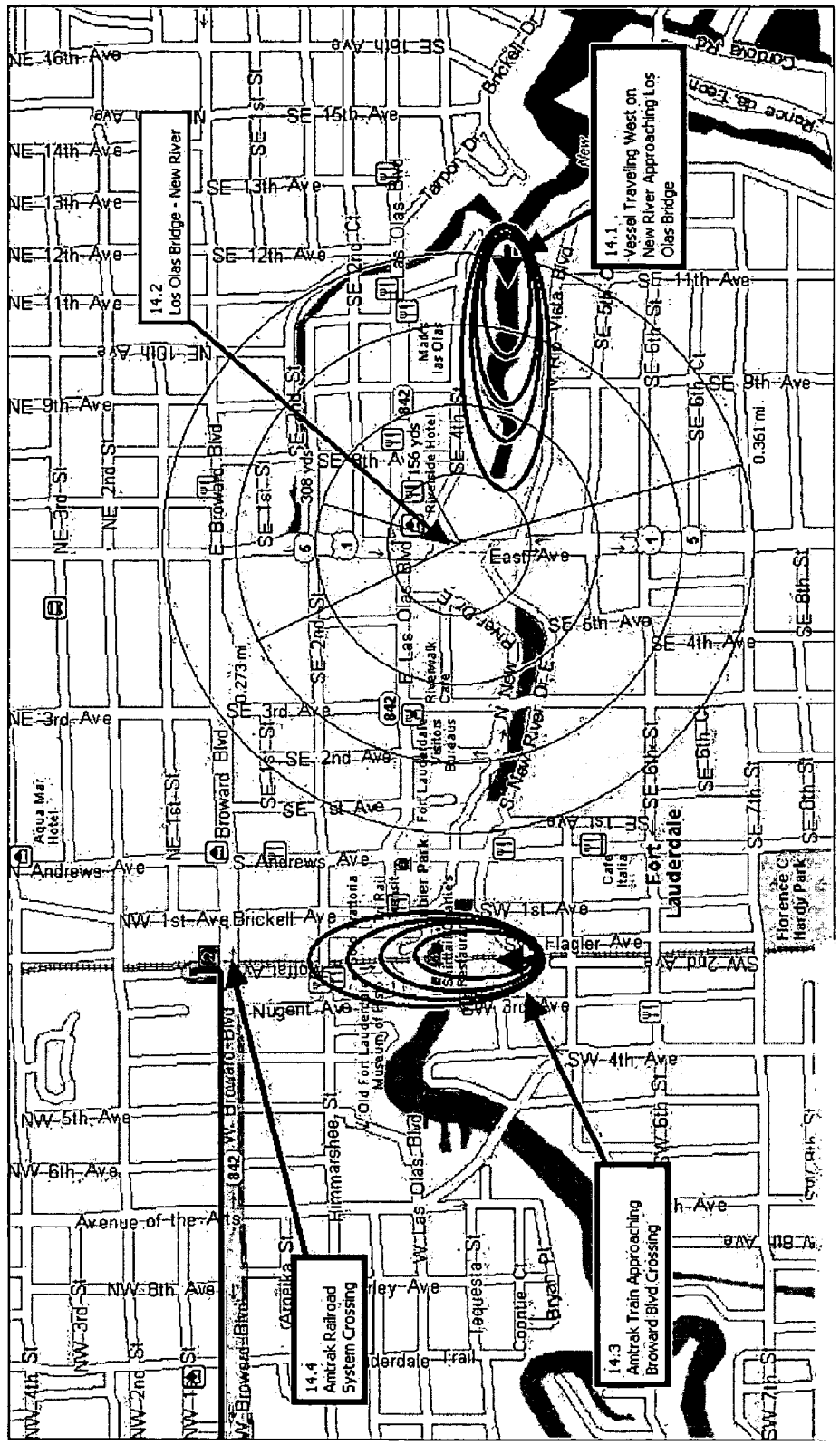
FIG. 14 is a eighth view of the map of FIG. 7.

The first series (FIGS. 7, 8, and 13) illustrates the initial route in FIG. 8. A close-up view of the end of the route in FIG. 7 illustrates views of the vessel traveling up the New River as well as the Train traveling north. The last Figure in this series, FIG. 13, illustrates the route and detailed instructions, estimated time of arrival at each turn as well as the distance from this point of origin.

Figure 10:
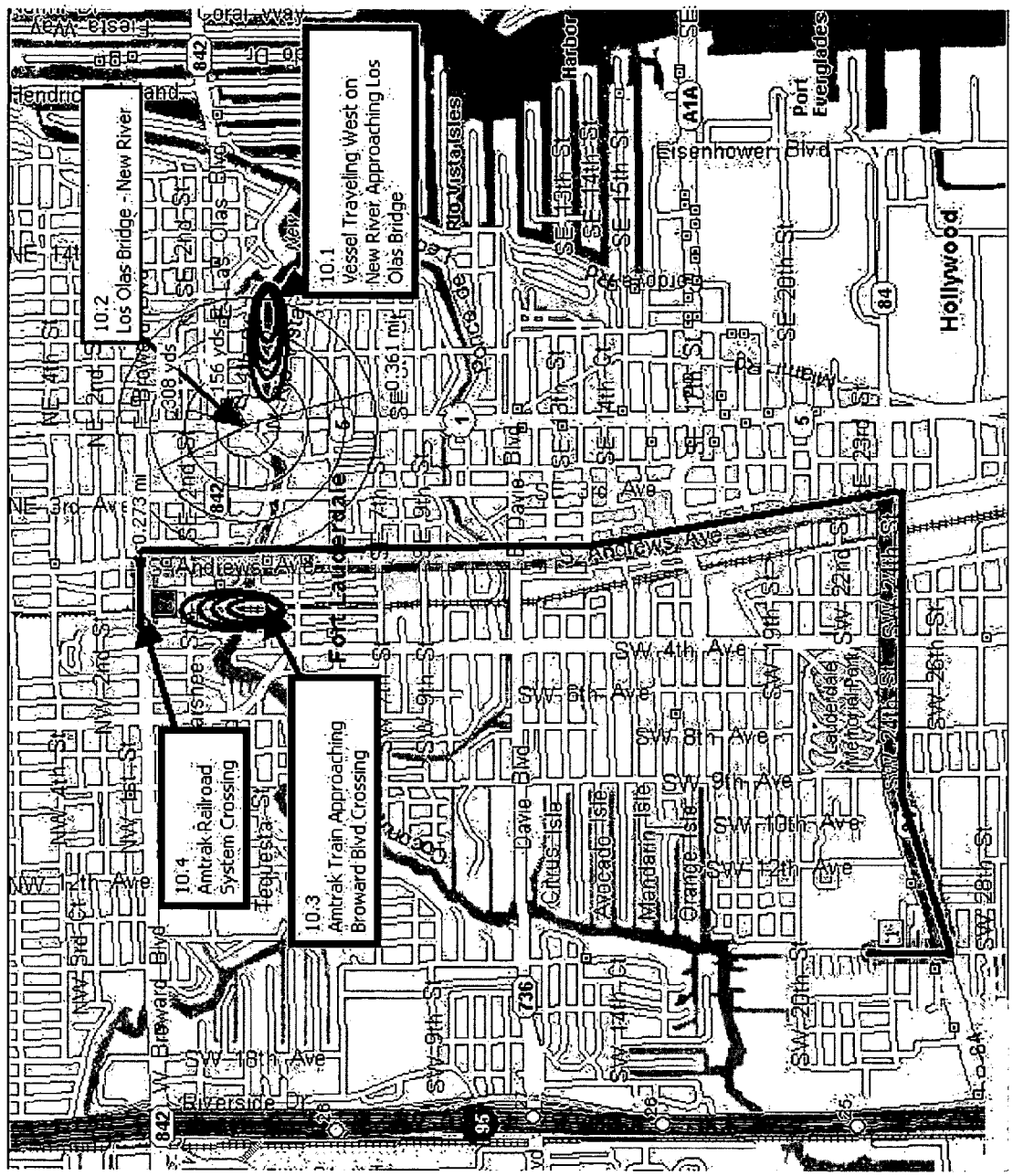
FIG. 10 is a fourth view of the map of FIG. 7.

The second series (FIGS. 9, 10, and 14), illustrate what happens when the vessel-traveling west on the New River generates a request for an opening based on its Route Vector and that opening request results in a Radial Impact Zone and Level of Impact Gradient Alarm being issued. In the overview of the route in FIG. 9, the route has been changed to direct the vehicle to use Andrews Avenue to travel north on to Broward Blvd. instead of US1. In FIG. 10, the Radial Impact Zone can be seen and the re-route of the vehicle can also be seen. This dynamic rerouting ends up in a revised route shown in FIG. 14 where the total distance to be traveled had decreased to 3.7 miles but the total travel time has increased to 10 minutes make the trip 3 minutes longer than originally planned.

Figure 11:
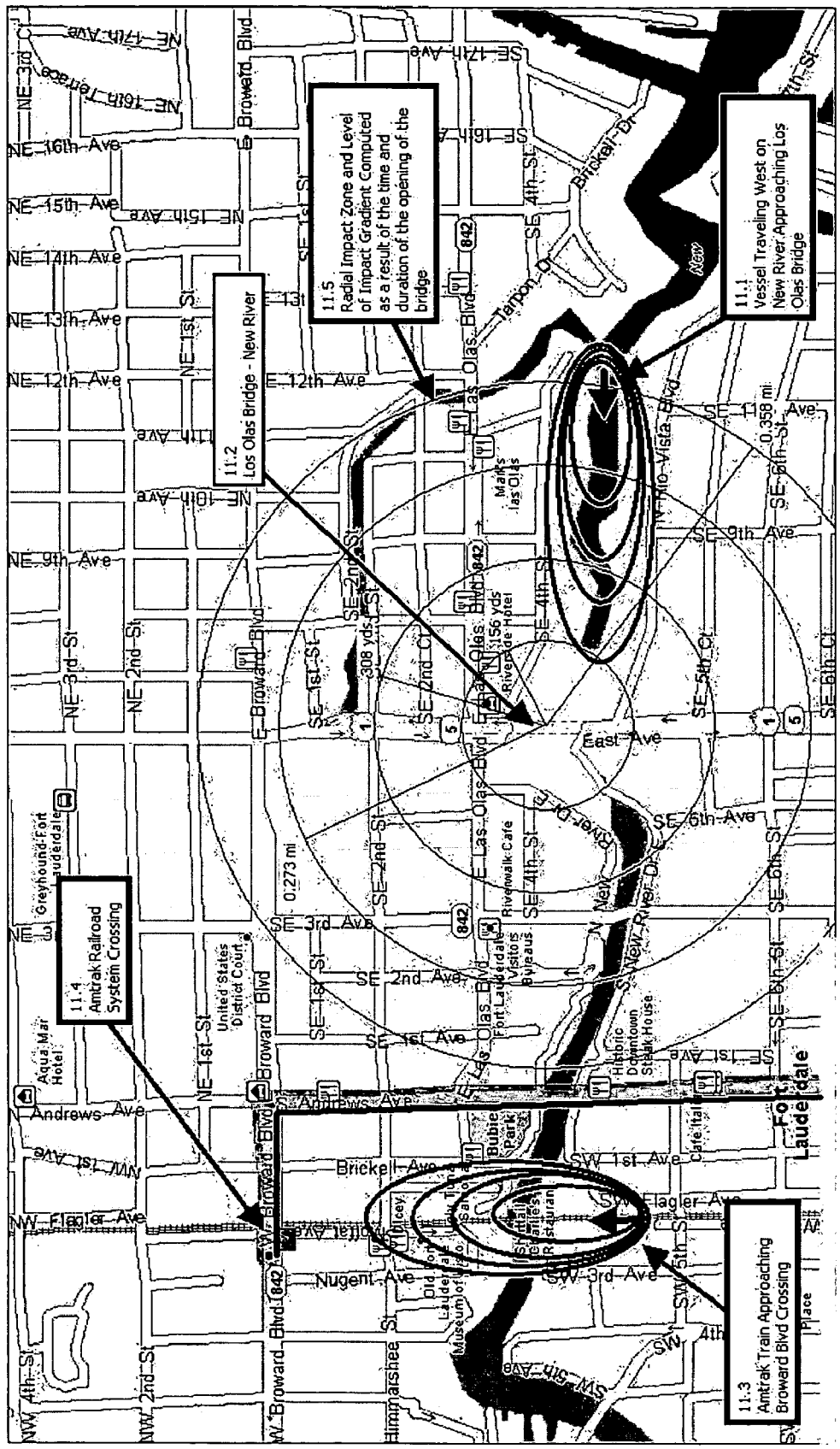
FIG. 11 is a fifth view of the map of FIG. 7.
Figure 12:
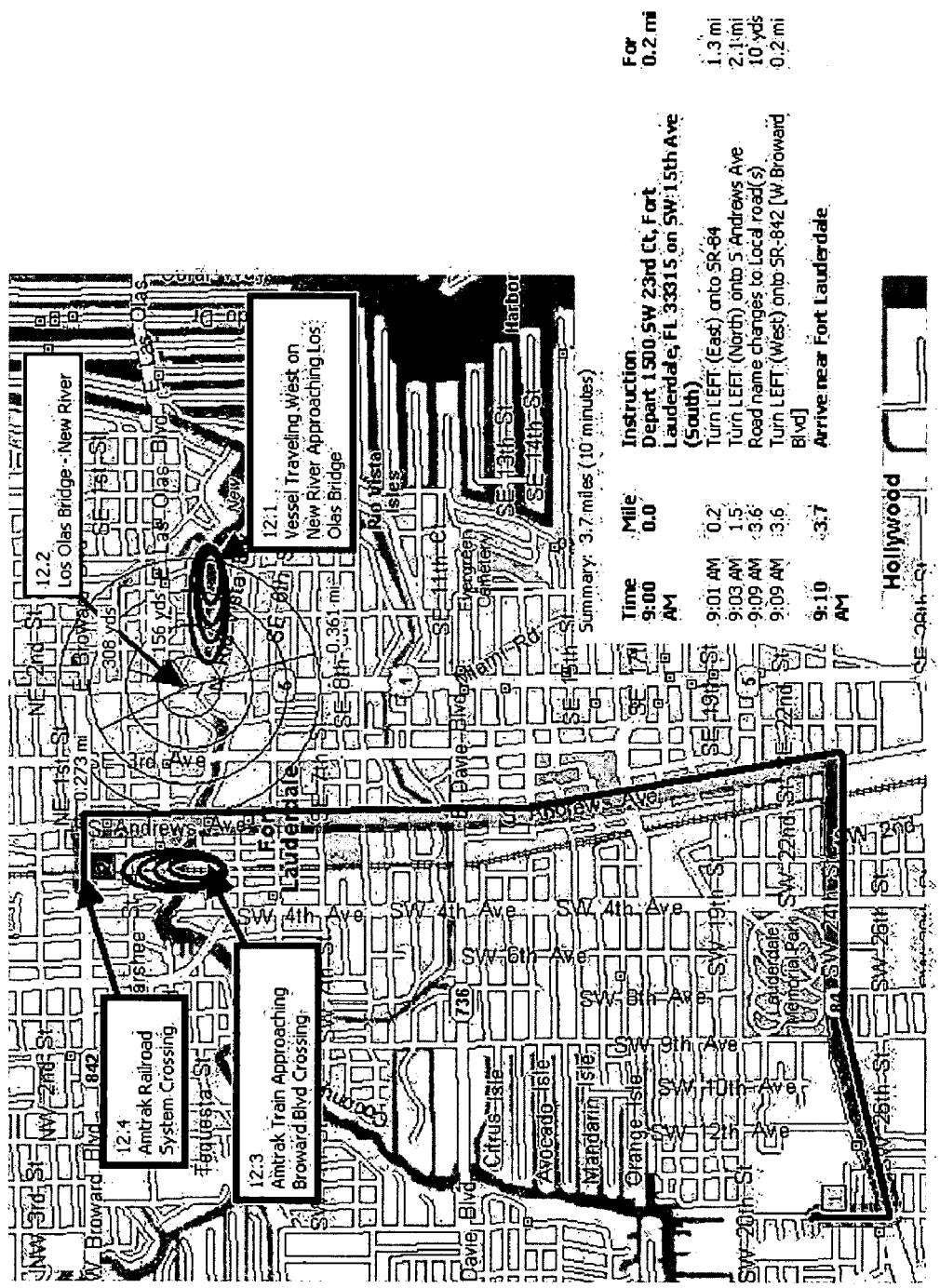
FIG. 12 is a sixth view of the map of FIG. 7.
Figure 15:
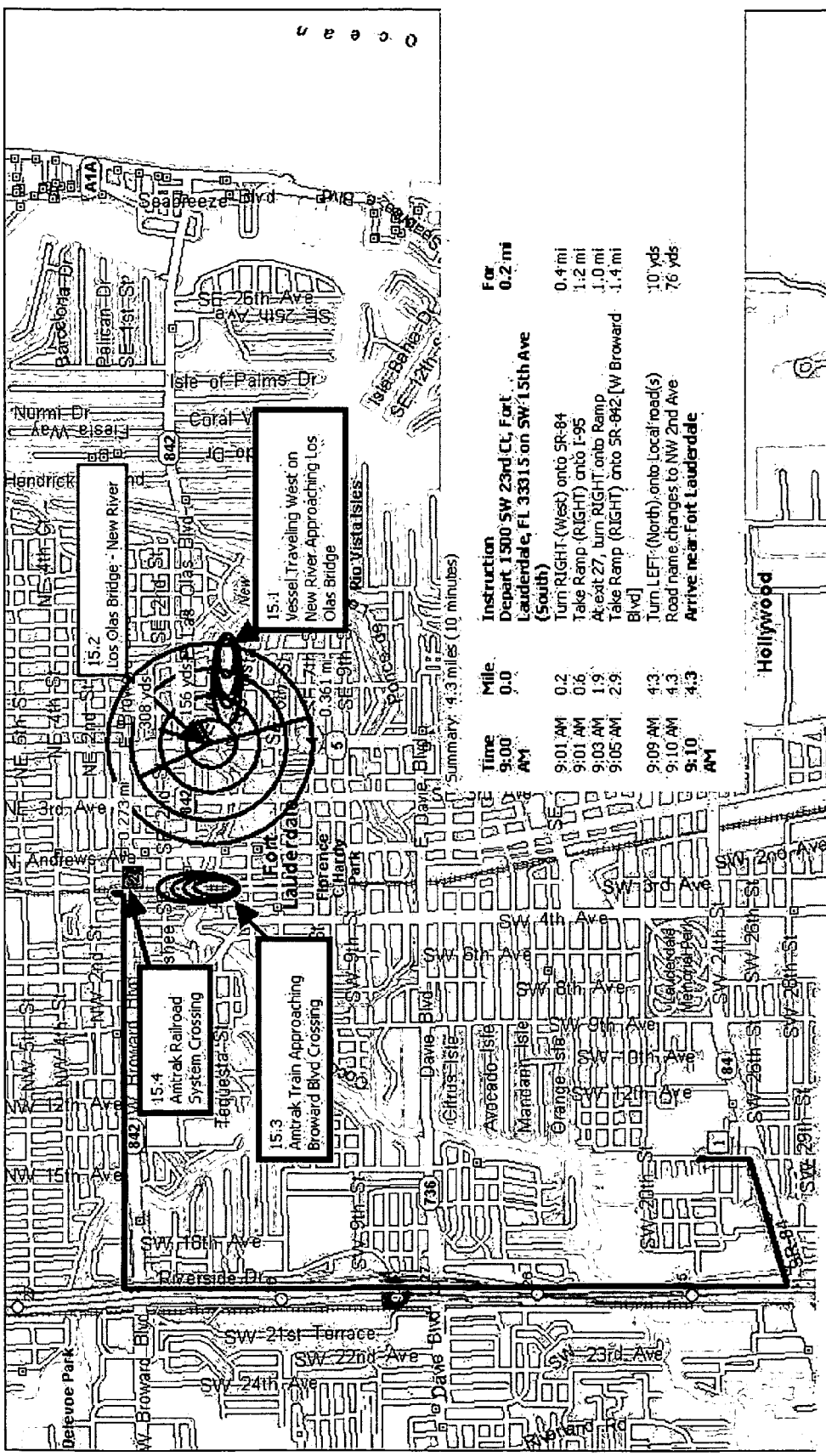
FIG. 15 is a ninth view of the map of FIG. 7.

The third and final series (FIGS. 11, 12, and 15) show what happens then the train traveling north will cause a delay in the planned route along Broward Blvd. The original planned route now has 2 known delays, one from the vessel causing a bridge opening at Los Olas and the other from the Metro Rail Train traveling north causing the crossing on Broward Blvd to be blocked. In FIG. 11, an overview of the second reroute is illustrated, showing the preferred route now to be to take State Road 84 west to Interstate 95 and then to travel north to Broward Blvd and then travel east to the destination. FIG. 12 shows a close up view of the destination and the railroad crossing that caused the reroute. FIG. 15 shows the final route to avoid the delays. The final route is 4.3 miles with an estimated travel time of 10 minutes, 3 minutes longer than the original route plan.

A more elaborate embodiment of the invention is now presented which will build on the communication interfaces to the traffic control and monitoring and data collection system 10. This elaboration will bring together the network 186, 188, the capabilities of the in-vehicle guidance and navigation system 10 (in whatever form meets the specific needs of the application) and the data interchange with the traffic control system 202. These elements are combined to provide public safety and security vehicles and personnel with an exemplary means of improving their response time in an emergency.

As is the case with most in-vehicle guidance and navigation systems, a destination location is required 162 along with a current location fix 166 to commence the processing of route planning and navigational guidance 168. By the very nature of a positional location system, the in-vehicle system will always maintain a fix as to its current location, direction and speed 166. When an emergency alarm occurs, the physical address or location of the event can either be entered into the in-vehicle navigation or guidance system manually through a number of input means including voice recognition or it can be transmitted to it over any suitable network by the dispatch person, system or function which receives the emergency alarm or alert 162. As described above in the one and two-way communicating system descriptions, the system (either the in-vehicle or traffic control system), will determine the best possible route to the target location and will initiate the first set of directions to the driver 168. It should be noted that in an emergency response vehicle, a visual display of the route may be helpful but an audio directional system will permit the driver to maintain full attention to the road and keep from having their attention diverted to look at a video screen. Once initiated, the onboard guidance and navigation system will initiate a communications session with the traffic control system and operator 172, 174, the dispatch system and operator, the driver and any other system or person required to complete the following steps (not shown in drawings), to facilitate the routing of the vehicle and response personnel from the point of origin to any number of destinations. The communications session, people and systems involved will:

1. Share real time, information on the location, speed and direction of the vehicle 174.

2. Share real time, information on the vehicles initial intended route 132.

3. Share real time, information on any known delays or obstruction along the planned route or any flow patterns that indicate a better route may be possible based on the initially defined route 198, 220. This will include any and all railroad crossing locations and railroad control centers, which route train traffic, as well as bridge tenders who control the open and closing of draw bridges, to permit boat traffic with height restrictions to pass 216.

4. Pass real time information from any authorized system or person to the onboard system to recommend changes in or overriding of the planned route 218.

5. Cause the onboard guidance and or navigation system to either compute a new route from its current location to the destination 200, 198 or accept a new route from any authorized system on the network 220 as a result of known obstructions, congestion or delays, and relay that new route to all systems on the network.

6. Cause the onboard guidance and or navigation system to either compute a new route from its current location to the destination 168 or accept a new route from any authorized system on the network from its current location to the destination 220, as a result of the driver not following the designated route 180, 192. This dynamic re-route would occur as a result of unknown obstructions in the planned route, which cause the driver to abort the designed route and take an alternate route.

7. Cause the original planned and or modified routes to be shared with the traffic control system or systems having control over traffic signaling devices along the planned and or modified route 174. These plans along with the location, speed and direction data pertaining to the vehicle following that route, will cause the traffic control system to perform whatever changes in state are necessary to ensure that all in route control signals, systems or devices are in a state, in sufficient time, to minimize or eliminate any traffic, congestion or in route delays 214. Timing of the traffic control devices at intersections is accomplished by the in-vehicle system, which makes every intersection on the planned route a waypoint in the route (not shown in drawing). As the vehicle travels along the planned route and applies dynamic changes, the estimated time of arrival will be computed and reported to the traffic control system for each intersection waypoint by the in-vehicle system, making the traffic control system aware of the estimated time of arrival of the vehicle at each intersection thus improving and overall efficiency and safety of the system 202. With sufficient data relating to the route and estimated times of arrival at each intersection, the traffic control system can effectively provide notification to vehicles and pedestrians along the route and ensure that traffic control are in the best state to ensure the most expedient transit of the emergency vehicle or vehicles 214.

8. The traffic control system being aware of the route and the vehicles progress along the route as well as any changes thereto will activate visual and audible alarms, strobes, horns, bells, flashing lights or directional arrows and signage along the route with sufficient time to notify vehicular and pedestrian traffic in the area of the approaching emergency vehicle, indicating its direction and eminent presence 218.

9. In the future, as vehicles come equipped with systems capable of receiving data related to the presence of an emergency vehicle, its route and location, they will either audible or visually alert the driver of its presence. This ability will be embedded into systems capable of receiving and processing signals like a radio or entertainment system. Today systems like radar detection systems already possess some early warning capabilities. More advanced vehicle navigation and guidance systems will be able to alter their planned route to avoid any possible interference with the planned path of the emergency vehicle if such a feature is desired 138.

Obviously, many modifications and variations of the present invention are possible in light of the above teachings. The invention may be practiced otherwise than as specifically described within the scope of the appended claims.

What is claimed is:

1. An information system for providing information to an operator of an emergency response vehicle, comprising:
   an input system for establishing a destination location of the emergency response vehicle;
   a positioning system for establishing a current position of the emergency response vehicle;
   a routing system on board the emergency response vehicle in two-way communication with at least one traffic control system via a two-way communications network, the at least one traffic control system being external to the emergency response vehicle, the routing system for automatically determining, without operator input, a planned route as a function of the destination location and the current position, sending the planned route to the at least one traffic control system using the two-way communications network and for receiving information relating to a factor, established as a function of the planned route, which may delay travel over the planned route, establishing a new current position, responsively determining if the planned route needs to be modified, and automatically determining, an alternate route as a function of the factor, the destination location, and the new current position if the planned route needs to be modified and sending the modified route plan to the at least one traffic control system over the two-way communications network.

2. An information system, as forth in claim 1, the communications network being a two-way network optionally supplemented by one way RFID points for transmitting vehicle data to the one or more traffic control systems.

3. An information system, as set forth in claim 2, the vehicle data including the current position of the emergency response vehicle, progress of the emergency response vehicle along the planned route, and vehicle operational characteristics.

4. An information system, as set forth in claim 2, wherein the routing system coordinates the planned route and/or the alternative routes to the at least one traffic control system.

5. An information system, as set forth in claim 4, the one or more traffic control systems including at least one traffic control signal, the routing system sending a request to the at least one of the traffic control system to control the at least one traffic control signal to minimize any impact of other traffic traveling along the planned route or the alternative route.

6. An information system, as set forth in claim 2, the at least one traffic control system for monitoring the position of the emergency response vehicle along the planned or alternative route to alert, in a timely fashion, vehicular and/or pedestrian traffic of the approaching emergency response vehicle.

7. An information system, as set forth in claim 6, wherein the traffic control system performs the alert using an audible alarm and/or an visual signal and/or other signal to be received by an appropriate device in other vehicles.

8. An information system, as forth in claim 2, the traffic control system including a railroad crossing system and a water way bridge opening system, the traffic control system monitoring the position of the motor vehicle along the planned or alternative route and coordinating with the railroad crossing and water way bridge opening systems.

9. An information system, as set forth in claim 8, the railroad crossing and water way bridge opening system includes one or more bridges and/or one or more railroad crossing.

10. An information system, as set forth in claim 8, information system including a railroad crossing and water way bridge opening system, one or more traffic control systems, the communications network being a two-way network for transmitting vehicle data to the one or more traffic control systems.

11. An information system, as set forth in claim 1, further comprising a preference device containing preference information related to the operator of the emergency response vehicle, the routing system for establishing the planned route and/or alternate route as a function of the preference information.

12. An information system, as set forth in claim 1, the input system comprising a user interface, the system further comprising a communication system for communicating information to the operator.

13. An information system, as set forth in claim 12, the communication system including a display coupled to the routing system for graphically and/or textually displaying the planned route and/or the alternate route to the operator.

14. An information system, as set forth in claim 1, the received information related to the factor including a plurality of parameters which may affect the estimated time of arrival.

15. An information system, as set forth in claim 14, the plurality of parameters including at least one of location of factor, vector coordinates of factor, radial impact of factor, or gradient impact of factor.

16. An information system, as set forth in claim 1, the routing system for monitoring the current position of the emergency response vehicle, determining if the operator has not followed the planned route, and responsively modifying the planned route as a function of the position of the emergency response vehicle and sending the modified route plan to the at least one traffic control system.

17. A computer based method for providing information to an operator of a emergency response vehicle, comprising:
   establishing a destination location of the emergency response vehicle;
   establishing a current position of the emergency response vehicle;

automatically determining a planned route as a function of the destination location and the current position, without operator input;

sending the planned route to at least one traffic control system over a two way communications network, the at least one traffic control system being external to the emergency response vehicle;

receiving information from the at least one traffic control system related to a factor, established as a function of the planned route, which may delay travel over the planned route; and, establishing a new current position and automatically determining an alternate route as a function of the received information, the destination location, and the new current position, without operator input, and sending the alternate route plan to the at least one traffic control system.

18. The method, as set forth in claim 17, including the step of communicating vehicle data to one or more traffic control systems.

19. The method, as set forth in claim 18, the vehicle data including the current position of the emergency response vehicle, progress of the emergency response vehicle along the planned route, and vehicle operational characteristics.

20. The method, as set forth in claim 17, including the step of coordinating the planned route and/or the alternative routes with the at least one traffic control system.

21. The method, as set forth in claim 20, including the step of monitoring the position of the emergency response vehicle along the planned or alternative route and alerting, in a timely fashion, vehicular and/or pedestrian traffic of the approaching emergency response vehicle.

22. The method, as set forth in claim 21, wherein the alert is an audible alarm and/or an visual signal and/or other signal to be received by an appropriate device in other vehicles.

23. The method, as set forth in claim 17, the at least one traffic control system including at least one traffic control signal, the method including the step of sending a request to the at least one of the traffic control system to control the at least one traffic control signal to minimize any impact of other traffic traveling along the planned route or the alternative route.

24. The method, as forth in claim 17, the traffic control system including a railroad crossing and water way bridge opening system, including the step of monitoring the position of the emergency response vehicle along the planned or alternative route and coordinating the railroad crossing and water way bridge opening system.

25. The method, as set forth in claim 24, the railroad crossing and water way bridge opening system including one or more bridges and/or one or more railroad crossing.

26. The method, as set forth in claim 17, including the steps of storing preference information related to an operator of the emergency response vehicle and establishing the planned route and/or alternate route as a function of the preference information.

27. A method, as set forth in claim 17, including the step of communicating the planned route and/or the alternate route to the operator.

28. A method, as set forth in claim 27, wherein the step of communicating the planned route and/or the alternate route to the operator includes the step of graphically and/or textually displaying the planned route and/or the alternate route to the operator on a display.

29. A method, as set forth in claim 27, wherein the step of communicating the planned route and/or the alternate route to the operator includes the step of audibly communicating the planned route and/or the alternate route to the operator.

30. A method, as set forth in claim 17, the received information related to the factor including a plurality of parameters which may affect the estimated time of arrival.

31. A method, as set forth in claim 30, the plurality of parameters including at least one of location of factor, vector coordinates of factor, radial impact of factor, or gradient impact of factor.

32. A method, as set forth in claim 17 including the step of monitoring the current position of the emergency response vehicle, determining if the operator has not followed the planned route, and responsively modifying the planned route as a function of the position of the emergency response vehicle and sending the modified route plan to the at least one traffic control system.

* * * * *